United States Patent [19]

Terrell et al.

[11] Patent Number: 5,134,048

[45] Date of Patent: Jul. 28, 1992

[54] ELECTROPHOTOGRAPHIC RECORDING MATERIAL CONTAINING PHOTOCONDUCTIVE PORPHYRIN COMPOUNDS

[75] Inventors: David R. Terrell, Lint; Stefaan K. De Meutter, Zandhoven, both of Belgium; Bernd Kaletta, Leverkusen, Fed. Rep. of Germany

[73] Assignee: Agfa-Gevaert, N.V., Mortsel, Belgium

[21] Appl. No.: 611,015

[22] Filed: Nov. 9, 1990

[30] Foreign Application Priority Data

Nov. 13, 1989 [EP] European Pat. Off. ............ 89121024

[51] Int. Cl.$^5$ ............................................... G03G 5/06
[52] U.S. Cl. ........................................ 430/58; 430/76; 430/78; 430/83; 430/59
[58] Field of Search ................ 430/58, 78, 76, 83, 430/59

[56] References Cited

U.S. PATENT DOCUMENTS

| | | | |
|---|---|---|---|
| 2,156,240 | 4/1939 | Hibbert | 424/92 |
| 3,895,944 | 7/1975 | Wiedemann et al. | 430/58 |
| 5,006,435 | 4/1991 | Alcasaki et al. | 430/59 |

FOREIGN PATENT DOCUMENTS

| | | | |
|---|---|---|---|
| 62-061981 | 3/1987 | Japan | 430/78 |
| 63-106662 | 5/1988 | Japan | 430/58 |

Primary Examiner—Marion E. McCamish
Assistant Examiner—C. Rodee
Attorney, Agent, or Firm—Breiner & Breiner

[57] ABSTRACT

An electrophotographic recording material comprising a conductive support and a photosensitive layer containing at least one photoconductive compound that has p-type charge generating capacity and is a tetrabenzoporphyrin type compound represented by the following general formula (I):

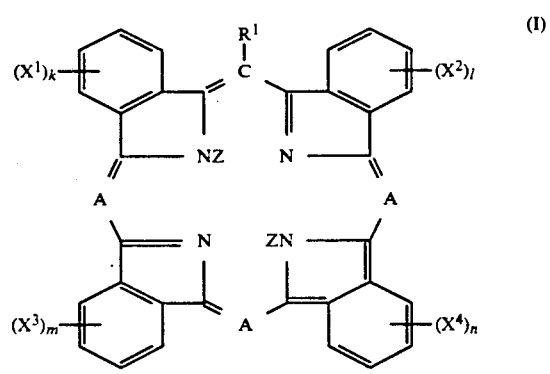

wherein:
each of $X^1$, $X^2$, $X^3$, and $X^4$ (same or different) represents a substituent selected from the group consisting of halogen, e.g. chlorine or bromine, nitro, cyano, ($C_1$-$C_2$) alkyl and alkoxy, e.g. methoxy or ethoxy or 2 $X^1$'s, 2 $X^2$'s, 2 $X^3$'s or 2 $X^4$'s together represent the atoms necessary to form a substituted or unsubstituted carbocyclic or heterocyclic ring system;
k, l, m, and n each and independently represent zero or an integer 1 to 4, $R^1$ represents hydrogen, a ($C_1$-$C_2$) alkyl, aralkyl or aryl group; each of the A's (same or different) represents nitrogen, or a $CR^2$ group, wherein each of the $R^2$'s (same or different) represents hydrogen, a ($C_1$-$C_2$) alkyl, aralkyl or aryl group; and Z is hydrogen or two groups Z together stand for a metal atom which in the case of higher valency state than 2, will be linked to (an) additional valency compensating atom(s) or group.

15 Claims, 11 Drawing Sheets

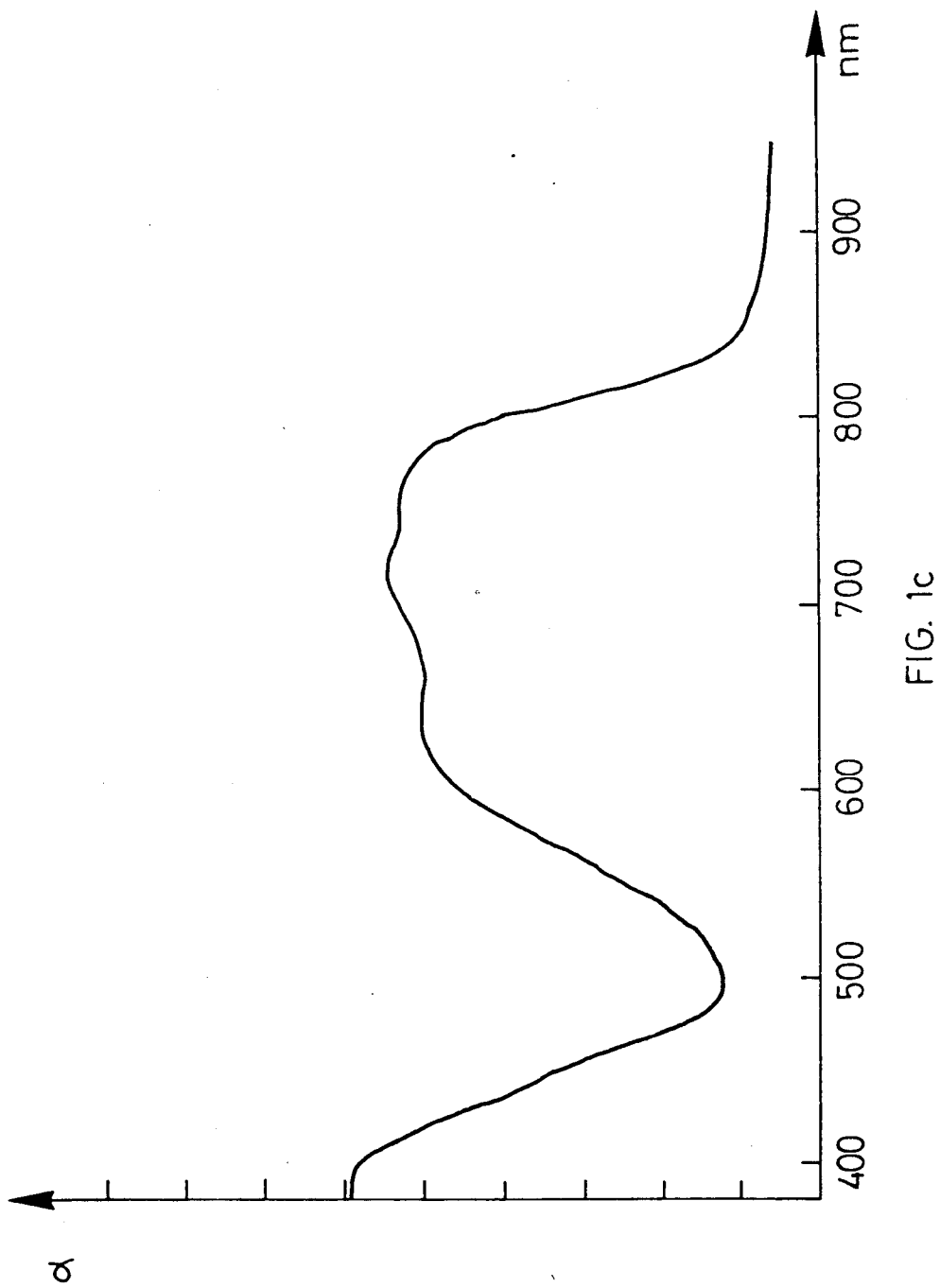

ELECTROPHOTOGRAPHIC RECORDING MATERIAL CONTAINING PHOTOCONDUCTIVE PORPHYRIN COMPOUNDS

FIELD OF THE INVENTION

The present invention relates to a photosensitive recording material suited for use in electrophotography.

BACKGROUND OF THE INVENTION

In electrophotography photoconductive materials are used to form a latent electrostatic charge image that is developable with finely divided colouring material, called toner.

The developed image can then be permanently affixed to the photoconductive recording material, e.g. photoconductive zinc oxide-binder layer, or transferred from the photoconductor layer, e.g. selenium layer, onto a receptor material, e.g. plain paper and fixed thereon. In electrophotographic copying and printing systems with toner transfer to a receptor material the photoconductive recording material is reusable. In order to permit a rapid multiple printing or copying a photoconductor layer has to be used that rapidly looses its charge on photo-exposure and also rapidly regains its insulating state after the exposure to receive again a sufficiently high electrostatic charge for a next image formation. The failure of a material to return completely to its relatively insulating state prior to succeeding charging/imaging steps is commonly known in the art as "fatigue".

The fatigue phenomenon has been used as a guide in the selection of commercially useful photoconductive materials, since the fatigue of the photoconductive layer limits the copying rates achievable.

Another Important property which determines whether or not a particular photoconductive material is suited for electrophotographic copying is its photosensitivity that must be high enough for use in copying apparatus operating with a copying light source of fairly low intensity.

Commercial usefulness further requires that the photoconductive layer has a chromatic sensitivity that matches the wavelength(s) of the light of the light source of the copier, e.g. laser, or has panchromatic sensitivity to allow the reproduction of all colours in balance.

Intensive efforts have been made to satisfy said requirements, e.g. the spectral sensitivity of selenium has been extended to the longer wavelengths of the visible spectrum by making alloys of selenium, tellurium and arsenic. In fact selenium-based photoconductors remained for a long time the only really useful photoconductors although many organic photoconductors were discovered.

Organic photoconductor layers of which poly(N-vinylcarbazole) layers have been the most useful were less interesting because of lack of speed, insufficient spectral sensitivity and rather large fatigue.

However, the discovery that 2,4,7-trinitro-9-fluorenone (TNF) in poly(N-vinylcarbazole) (PVCz) formed a charge-transfer complex strongly improving the photosensitivity (ref. U.S. Pat. No. 3,484,237) has opened the way for the use of organic photoconductors in copying machines that could compete with the selenium-based machines.

TNF acts as an electron acceptor whereas PVCz serves as electron donor. Films consisting of said charge transfer complex with TNF:PVCz in 1:1 molar ratio are dark brown, nearly black and exhibit high charge acceptance and low dark decay rates. Overall photosensitivity is comparable to that of amorphous selenium (ref. Schaffert, R. M. IBM J. Res. Develop., 15. 75 (1971).

A further search led to the discovery of phthalocyanine-binder layers, using poly(N-vinylcarbazole) as the binder [ref. Hackett, C. F., J. Chem. Phys., 55. 3178 (1971)]. The phthalocyanine was used in the metal-free X form and according to one embodiment applied in a multilayer structure wherein a thin layer of said phthalocyanine was overcoated with a PVCz layer. Hackett found that photoconductivity was due to field dependent photogeneration of electron-hole pairs in the phthalocyanine and hole injection into the PVCz. The transport of the hole carriers, i.e. positive hole conduction proceeded easily in the PVCz layer. From that time on much research has been devoted to developing improved photoconductive systems wherein charge generation and charge transport materials are separate in two contiguous layers (see e.g. U.K. Pat No. 1,577,859). The charge generating layer may be applied underneath or on top of the charge transport layer. For practical reasons, such as less sensitivity to wear and ease of manufacture, the first mentioned arrangement is preferred wherein the charge generating layer is sandwiched between a conductive support and a light transparent charge transport layer as described e.g. by Wolfgang Wiedemann In the article titled: "Organische Photoleiter—Ein Uberblick, II" published in Chemiker Zeitung, 106. (1982) Nr. 9 p. 315.

Photoconductive recording materials as can be learned from the preamble may exist in different configurations with one or more "active" layers coated on an electrically conductive substrate. By active layer is meant a layer that plays a role in the formation of the electrostatic charge image. Such layer may be a monolayer photoconductive layer being responsible for both charge carrier generation and charge carrier transport or in a system of two active layers a layer that is responsible for charge carrier generation or charge transport.

In order to form a photoconductive two layer-system with high photosensitivity to the incident light efficient charge generating substances are required that operate in conjunction with efficient charge transport substances.

Various organic dyes and pigments have been proposed as charge generating substances.

Most of the organic dyes or pigments of the charge generating layer provide more efficient hole injection than electron injection across a field-lowered barrier at the interface where pigment-dye/charge transport compounds touch each other and a charge transfer complex compound is possibly formed.

Efficient p-type charge transport compounds can be found in the group consisting of aromatic homocyclic amino compounds, e.g. triarylamino compounds, heteroaromatic amino compounds, unsaturated heterocyclic amino compounds, hydrazone compounds, triphenylmethane, oxazole and pyrazoline derivatives or polymeric p-type charge transport substances incorporating groups corresponding with one of the above types of compounds.

Examples of double layer systems containing heteroaromatic compounds or amino-substituted unsaturated heterocyclic compounds as charge transporting substances are described in DE-P 2 237 539, U.S. Pat.

No. 3,837,851 and in our co-pending published European Patent applications (EP-A) 347 960, 347 967 and 349 034 and in unpublished European Patent Applications Nos. 89200707.1 and 90201600.5.

Examples of triarylamino derivatives that are useful as charge transporting compounds in a double layer photoconductive system are given in U.S. Pat. No. 4,265,990.

Examples of hydrazone compounds as charge transporting substances are described in U.S. Pat. Nos. 4,278,747 and 4,365,014 and in our co-pending unpublished European Patent Applications Nos. 90200717.8 and 90200968.7.

Examples of triphenylmethane derivatives that are useful as charge transporting compounds in a double layer photoconductive system are given in U.S. Pat. Nos. 4,050,935, 4,140,529 and 4,330,608.

Efficient n-type charge transport compounds can be found in the group consisting of aromatic ketones optionally substituted with at least one electron withdrawing substituent, e.g. halogen, nitro, nitrile, carbamate group, acyl group or carboxylic acid ester group and optionally condensed with malonodinitrile, a malononitrile monocarboxyester or a malonic acid diester; cyanoalkylene compounds, aromatic compounds with electron withdrawing substituents, aromatic ketones in which one or more of the keto-groups have been substituted by two mercapto groups, a sulphone group, an imino cyanide group (=N—CN) or polymeric n-type substances incorporating groups corresponding with one or more of the above mentioned types of compounds.

Examples of aromatic ketones substituted with at least one electron withdrawing substituent are described e.g. by R. O. Loutfy, C. K. Hsiao, B. S. Ong and B. Keoshkerian In Canadian Journal of Chemise, Vol. 62, p. 1877 (1984). These authors also describe aromatic ketones condensed with malonodinitrile, malononitrile monocarboxyester or a malonic acid diester and aromatic ketones in which keto groups are replaced by two mercapto groups. Aromatic ketones in which at least one of the keto groups has been replaced by an imino cyanide group or a sulphone group are described In DE-OS 3 437 814 and U.S. Pat. No. 4,514,481 respectively.

Useful charge generating substances are In the following classes:

a) perylimides, e.g. C.I. 71 130 (C.I.=Colour Index) described in DBP 2 237 539, b) polynuclear quinones, e.g. anthanthrones such as C.I. 59 300 described in DBP 2 237 678, c) quinacridones, e.g. C.I. 46 500 described in DBP 2 237 679, d) naphthalene 1,4,5,8-tetracarboxylic acid derived pigments including the perinones, e.g. Orange GR, C.I. 71 105 described in DBP 2 239 923, e) phthalocyanines, e.g. H2-phthalocyanine in X-crystal form (X—H$_2$Pc), metal phthalocyanines, e.g. copper phthalocyanine, C.I. 74 160 described in DBP 2 239 924, indium phthalocyanine and titanyl phthalocyanine described in U.S. Pat. Nos. 4,713,312 and 4,728,592, f) indigo- and thioindigo dyes, e.g. Pigment Red 88, C.I. 73 312 described in DBP 2 237 680, g) benzothioxanthene-derivatives as described e.g. in DAS 2 355 075, h) perylene 3,4,9,10-tetracarboxylic acid derived pigments including condensation products with o-diamines as described e.g. in DAS 2 314 051, i) Polyazo dyes or pigments, e.g. Chlordiane Blue C.I. 21 180 described in DAS 2 635 887, the bisazo pigments described in DOS 2 919 791, DOS 3 026 653, DOS 3 032 117 and U.S. Pat. No. 4,123,270, and particular trisazo-pigments described in U.S. Pat. No. 4,687,721.

j) squarilium dyes as described e.g. in DAS 2 401 220, k) polymethine dyes.

l) triarylmethane dyes, and m) dyes containing 1,5 diamino-anthraquinone groups.

Charge generating dyes and pigments not only have to fulfill the requirement of a high charge generating capacity in the spectral range of practically useful exposure sources such as incandescent light bulbs, fluorescent light tubes and lasers, but have to maintain that property for repetitive use without unacceptable deterioration in characteristics A search is still going on to find charge generating substances that optimally combine light-sensitivity without deterioration with high charge generating capacity and low residual potential after exposure. With the advent of compact near IR-emitting laser diodes with emission at 780 to 850 nm depending on the laser diode composition, there has been increasing demand for charge generating pigments with maximum sensitivity in this wavelength range.

U.S. Pat. No. 3,895,944 discloses a charge carrier producing dyestuff layer of a dyestuff corresponding to the general formula:

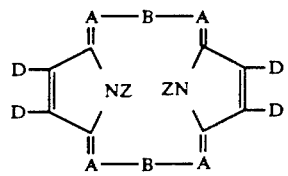

wherein:

Z is hydrogen or two groups Z together stand for a bivalent metal atom,

A Is nitrogen or CR, with R being hydrogen, alkyl with 1 to 4 carbon atoms, phenyl, which may be substituted by alkyl with 1 to 4 carbon atoms or halogen, and B is an m-phenylene, 2,6-pyridylene, 1,3-isoindylene or pyrrolylene group, and D is hydrogen, or two groups D together stand for a group

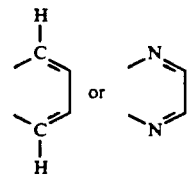

with the proviso that 1. if B is m-phenylene or 2,6-pyridylene, A is nitrogen and two groups D together stand for a group

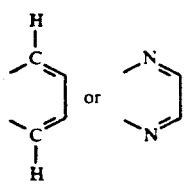

2. if B is 1,3-isoindolylene, A is nitrogen and two groups D together stand for a group

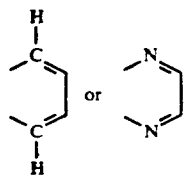

3. if B is pyrrolylene, A is CR and D is hydrogen.

Said patent further discloses that when used in multi-layer materials, with a top charge transporting layer, the phthalocyanines display a very high degree of photosensitivity within the spectral range between 550 and 750 nm. Furthermore it is evident from the examples that multi-layer photoconductors with porphyrin pigments such as meso-tetraphenylporphyrin exhibit vastly inferior photosensitivities to those with phthalocyanine pigments.

Surprisingly it has been found that certain porphyrin pigments exhibit superior photosensitivities when incorporated in multilayer or single layer organic photosensitive materials and furthermore that particular porphyrin pigments exhibit high photosensitivities in the wavelength range 780 to 850 nm with maximum sensitivities in said wavelength range.

SUMMARY OF THE INVENTION

It is an object of the present invention to provide an electrophotographic recording material comprising a conductive support and a photosensitive layer containing a photoconductive porphyrin compound that has high charge generating efficiency.

It is a further object of the present invention to provide a photoconductive recording material comprising a conductive support and a charge transporting layer in contiguous relationship with a charge generating layer containing a photoconductive porphyrin pigment having a high positive hole generating capacity i.e. high p-type charge generating capacity and high electron generating capacity, i.e. high n-type charge generating capacity, combined with good cyclic behaviour in repetitive use.

It is a further object of the present invention to provide an electrophotographic recording material comprising a conductive support and a photosensitive layer with improved photosensitivity in the wavelength range 780 to 850 nm.

It is a further object of the present invention to provide a photoconductive recording material comprising a conductive support and a charge transporting layer in contiguous relationship with a charge generating layer with improved photosensitivity in the wavelength range 780 to 850 nm.

It is another object of the present invention to provide a recording process wherein a charge pattern of negative charge is formed on said photoconductive composite layer recording material by negatively charging its p-type charge transport layer and image-wise photo-exposing said charge generating layer containing a photoconductive porphyrin compound.

It is another object of the present invention to provide a recording process wherein a charge pattern of positive charge is formed on said photoconductive composite layer recording material by positively charging its n-type charge transport layer and image-wise photo-exposing said charge generating layer containing a photoconductive porphyrin compound.

Other objects and advantages of the present invention will appear from the further description and examples.

In accordance with the present invention an electrophotographic recording material is provided comprising a conductive support and a photosensitive layer containing at least one photoconductive compound that has p-type charge generating capacity and is a tetrabenzoporphyrin type compound represented by the following general formula (I):

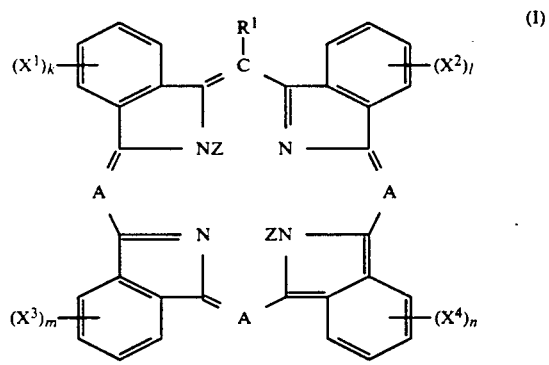

wherein:
each of $X^1$, $X^2$, $X^3$ and $X^4$ (same or different) represents a substituent selected from the group consisting of halogen, e.g. chlorine or bromine, nitro, cyano, ($C_1$–$C_2$) alkyl and alkoxy, e.g. methoxy or ethoxy or 2 $X^1$'s, 2 $X^2$'s, 2 $X^3$'s or 2 $X^4$'s together represent the atoms necessary to form a substituted or unsubstituted carbocyclic or heterocyclic ring system; k, l, m, and n each and independently represent zero or an integer 1 to 4, $R^1$ represents hydrogen, a ($C_1$–$C_2$) alkyl, aralkyl or aryl group; each of the A's (same or different) represents nitrogen, or a $CR^2$ group, wherein each of the $R^2$'s (same or different) represents hydrogen, a ($C_1$–$C_2$) alkyl, aralkyl or aryl group; and Z is hydrogen or two groups Z together stand for a metal atom which in the case of higher valency state than 2, as e.g. titanium, will be linked to (an) additional valency compensating atom(s) or group, e.g. halogen or oxygen.

BRIEF DESCRIPTION OF THE DRAWINGS

FIG. 1a, 1b and 1c represent absorption spectra of α-, β- and ω-crystalline modifications respectively of metal-free tetrabenzotriazaporphyrin before treatment with hot liquids. The relative absorption (α) is in the ordinate and the wavelength given in nanometer (nm) is in the abscissa.

DETAILED DESCRIPTION OF THE INVENTION

In a preferred embodiment according to the present invention the charge generating compound according to general formula (1) has hydrogen in both the definitions of Z and $R^2$, and nitrogen for the definition of A, and is more preferably metal-free tetrabenzotriazaporphyrin.

Figure 1A:
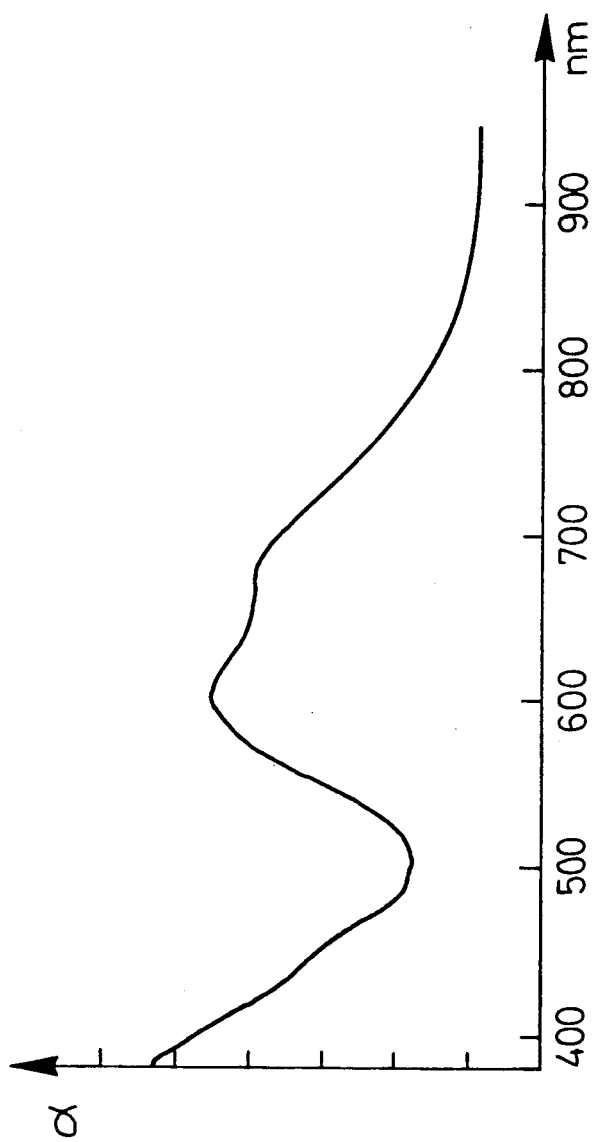

In a particularly preferred embodiment according to the present invention an electrophotographic recording material is provided in which the charge generating substance being a photoconductive compound within the scope of the above general formula (I) is present in the ω-modification as characterized by its absorption spectrum shown In FIG. 1c and its X-ray diffraction pattern exhibiting strong lines at Bragg angles (2θ) of 8.5; 10.2; 11.9; 14.4; 18.0; 20.4; 22.6; 24.0; 24.7 and 29.8 degrees. The preparation of said substance in ω-modification is described in present Examples 1 and 4 and likewise in unpublished German Patent Application No. P 39 37 716.4 entitled: "Heterocyclische Verbindungen und daraus erhältliche Porphyrin-Verbindungen" filed by Bayer Aktiengesellschaft, 5090 Leverkusen, Bayerwerk, Deutschland.

The synthesis of tetrabenzoporphyrin, tetrabenzomonoazaporphyrin and tetrabenzodiazaporphyrin is reported by Helberger in Annalen, volume 529, (1937), 205-218. The preparation of tetrabenzotriazaporphyrin from phthalocyanine and phthalonitrile is described by Barrett, Linstead, Tuey and Robertson in J. Chem. Soc. (1939). 1809-1820. The preparation of tetrabenzoporphyrin, tetrabenzomonazaporphyrin and their metallic derivatives together with their absorption spectra in chloronaphthalene solution are described by Barrett, Linstead Rundall and Tuey In J. Chem. Soc. (1940), 1079-1092. The preparation of tetrabenzotriazaporphyrin is described in U.S. Pat. No. 2,166,240 and the preparation of azabenzoporphyrins with various numbers of nitrogen bridge atoms is described by T. F. Kachura et al., in Vestsi Akad. Nauk. Belarus. SSR, Ser. Khim. Nauk, issue number 1, (1969), 65-72.

The preparation of the intermediate 1-amino-3-iminoisoindolenine used in Example 1 is described by W. Wolf et al., in Angewandte Chemie, volume 72, (1960), 963-966. Other possible intermediates are methylene phthalimidine, phthalodinitrile, phthalimidylacetic acid, phthalic anhydride, o-bromoacetophenone, o-bromobenzoylaceto-acetic ester, etc.

From the above-mentioned literature on synthesis it can be learned that the replacement of the aza-bridges in phthalocyanine with CH-bridges results in a hypsochromic shift in the absorption spectra in solution and a decrease In the extinction coefficients of the long wave-length absorption bands (600-700 nm) in favour of the short wavelength absorption bands (400-500 nm), this shift increasing with the number of aza-bridges replaced.

Specific examples of chemical structures of pigments suitable for use according to the present invention are listed in Table 1 below:

TABLE 1

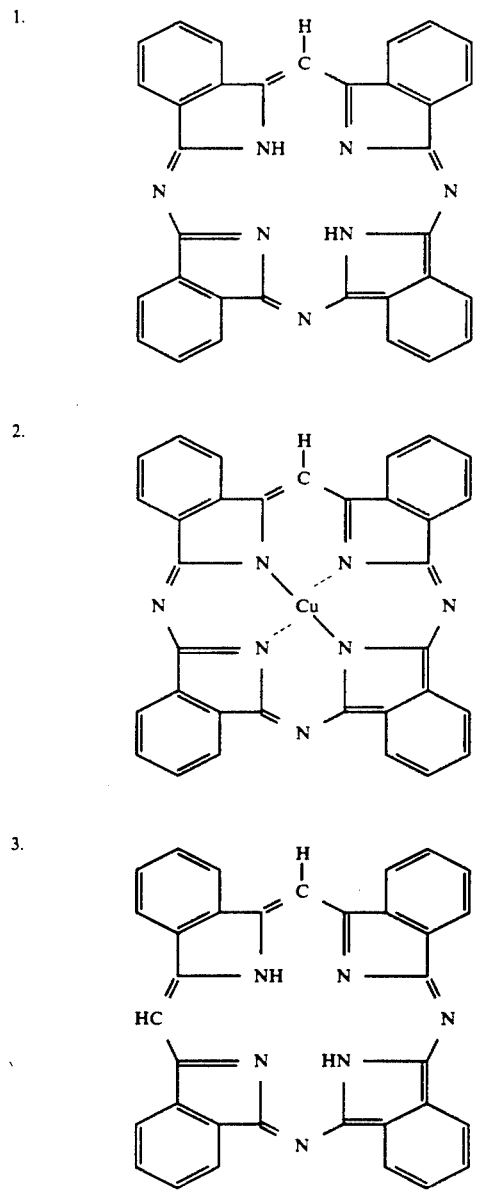

TABLE 1-continued
4. 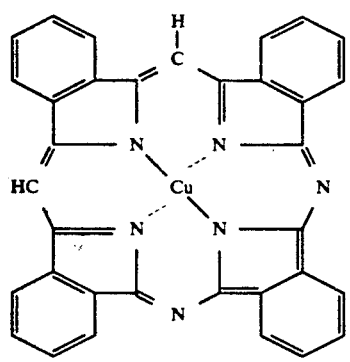
5. 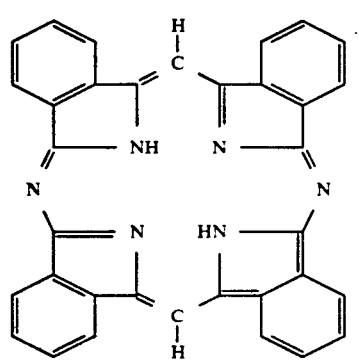
6. 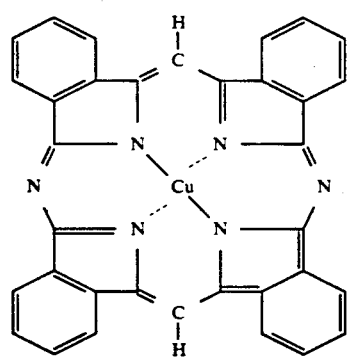
7. 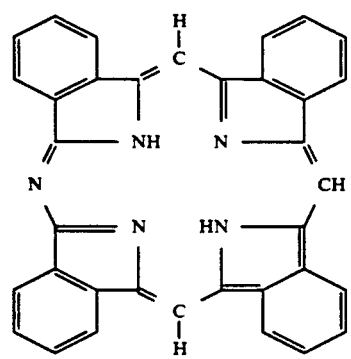
8. 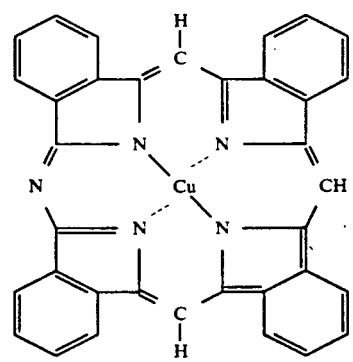
9. 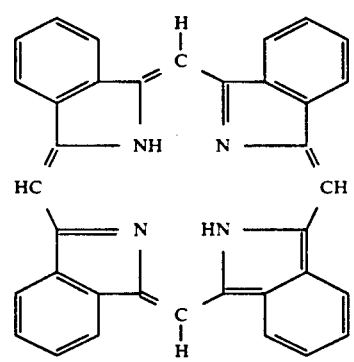
10. 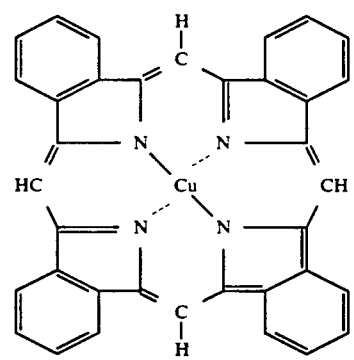
11. 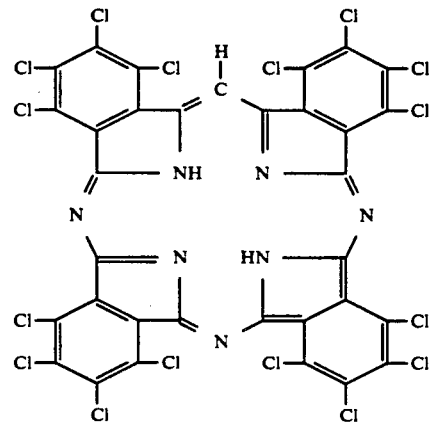

TABLE 1-continued

12.

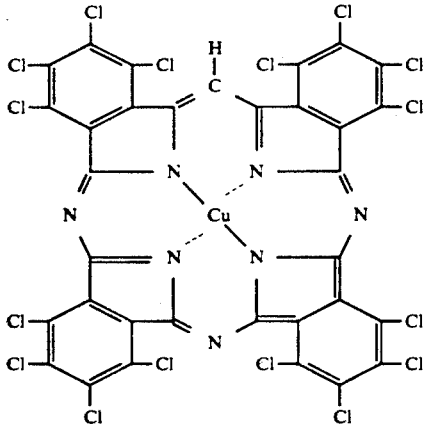

13.

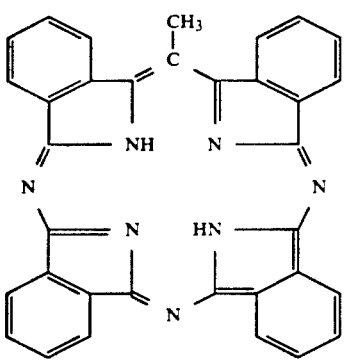

It has been found by us that pigments according to formula (I) can exist in various crystalline modifications characterized by different X-ray diffraction and absorption spectra. These modifications are produced e.g. by specific grinding conditions, acid pasting, contact with specific solvents at specific temperatures etc. The charge generation efficiency has been found to vary with crystal modification.

Figure 2:
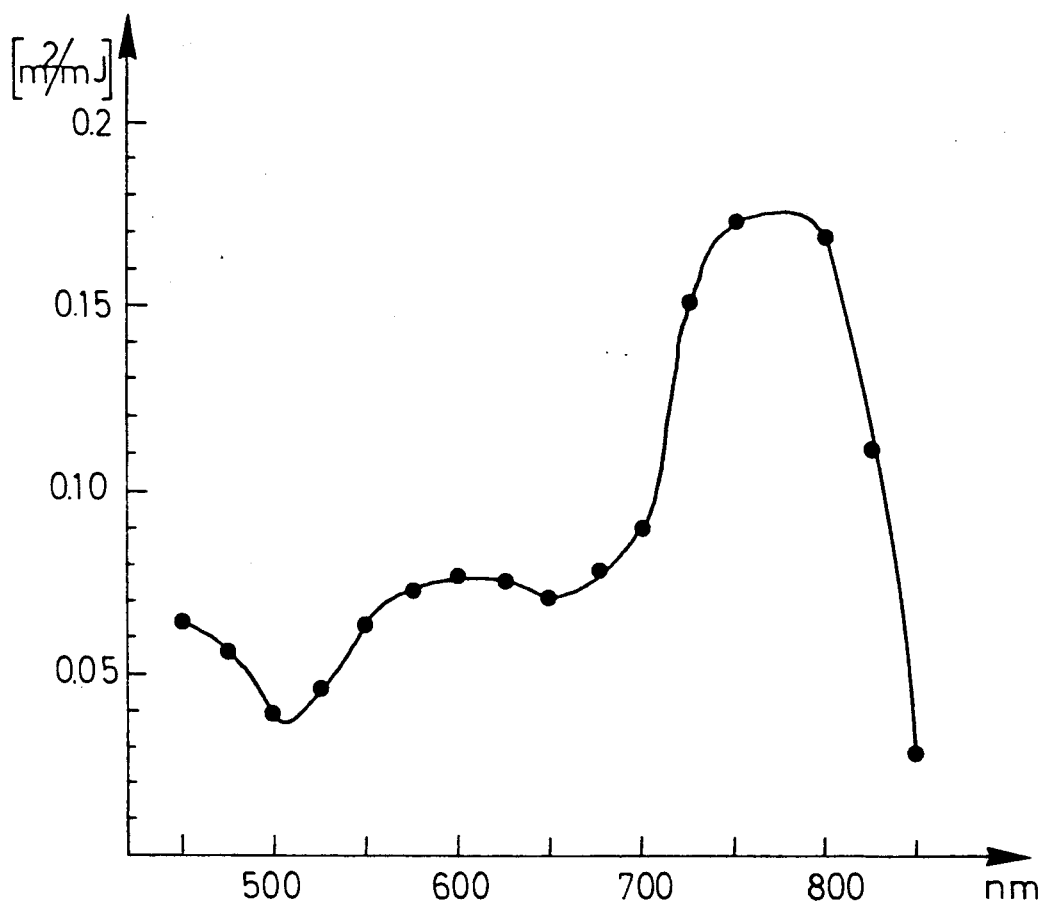
FIG. 2 represents the spectral sensitivity curve of the ω-crystalline modification of metal-free tetrabenzotriazaporphyrin in which the reciprocal of the exposure [m²/mJ] required to reduce the initial charging level by half $1/(I_o t_{\frac{1}{2}})$ is plotted against wavelength (nm).

Charge generation pigments used according to the present invention exhibit photosensitivities in the wavelength range 550 to 850 nm depending upon the chemical structure and the particular crystalline modification. The spectral sensitivity of a pigment used according to the present invention is shown in FIG. 2 in which the reciprocal of the incident light exposure in $m^2/mJ$ required to reduce the charging level to half its initial value is plotted against the wavelength in nm of the incident light from a monochromator. The measurement was carried out on a recording material containing as described in Example 4 a hydrolyzed silane adhesion layer, a charge generation layer consisting of 40% by weight of pigment in bisphenol A polycarbonate and a charge transport layer consisting of 50% by weight of 1,2-bis(1,2-dihydro-2,2,4-trimethyl-quinolin-1-yl)ethane in a higher molecular weight bisphenol A polycarbonate than that used in the charge generation layer.

For the production of recording materials according to the present invention at least one pigment according to formula (I) is:
- applied in a resin binder to an electrically conductive substrate; or
- applied together with a charge transport material to an electrically conductive substrate; or
- applied in combination with a resin binder to form a charge generation layer adhering directly to a charge transporting layer, the two layers being supported by an electrically conductive substrate.

The resin binders are selected on the basis of optimal mechanical strength, adhesion and favourable electrical properties.

Suitable electronically inactive binder resins for use in the charge transporting layer are e.g. cellulose esters, acrylate and methacrylate resins, cyanoacrylate resins, polyvinyl chloride, copolymers of vinyl chloride, e.g. a copolymer of vinyl chloride with vinyl acetate and maleic anhydride, polyester resins, e.g. copolyesters of isophthalic acid and terephthalic acid with glycol or aromatic polycarbonate resins.

A polyester resin particularly suited for use in combination with aromatic polycarbonate binders is DYNAPOL L 206 (registered trade mark of Dynamit Nobel for a copolyester of terephthalic acid and isophthalic acid with ethylene glycol and neopentyl glycol, the molar ratio of tere- to isophthalic acid being 3/2). Said polyester resin improves the adherence to aluminium that may form a conductive coating on the support of the recording material.

Suitable aromatic polycarbonates can be prepared by methods such as those described by D. Freitag, U. Grigo, P. R. Müller and W. Nouvertne in the Encyclopedia of Polymer Science and Engineering, 2nd ed., Vol. II, pages 648-718, (1988) published by Wiley and Sons Inc., and have one or more repeating units within the scope of the following general formula (II):

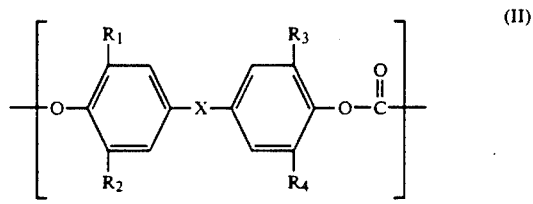

(II)

wherein:
X represents S, $SO_2$,

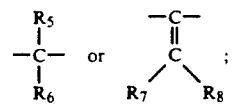

$R_1$, $R_2$, $R_3$, $R_4$, $R_7$ and $R_8$ each represents (same or different) hydrogen, halogen, an alkyl group or an aryl group, and $R_5$ and $R_6$ each represent (same or different) hydrogen, an alkyl group, an aryl group or together represent the necessary atoms to close a cycloaliphatic ring, e.g. cyclohexane ring.

Aromatic polycarbonates having a molecular weight in the range of 10,000 to 200,000 are preferred. Suitable polycarbonates are sold under the registered trade mark MAKROLON of Farbenfabriken Bayer AG, W-Germany.

MAKROLON CD 2000 (registered trade mark) is a bisphenol A polycarbonate with molecular weight in the range of 12,000 to 25,000 wherein $R_1=R_2=R_3=R_4=H$, X is $R_5$-C-$R_6$ with $R_5=R_6=CH_3$.

MAKROLON 5700 (registered trade mark) is a bisphenol A polycarbonate with molecular weight in the range of 50,000 to 120,000 wherein $R_1=R_2=R_3=R_4=H$, X is $R_5\text{-}C\text{-}R_6$ with $R_5=R_6=CH_3$.

Bisphenol Z polycarbonate Is an aromatic polycarbonate containing recurring units wherein $R_1=R_2=R_3=R_4=H$, X is $R_5\text{-}C\text{-}R_6$, and $R_5$ together with $R_6$ represents the necessary atoms to close a cyclohexane ring.

Further useful binder resins are silicone resins, polystyrene and copolymers of styrene and maleic anhydride or of butadiene and styrene.

An example of an electronically active resin binder is poly-N-vinylcarbazole or copolymers thereof.

The ratio wherein the charge generating porphyrin pigment and the resin binder are mixed can vary. However, relatively specific limits are imposed, e.g. to avoid flocculation. A useful content of the porphyrin pigment applied according to the present invention in the light-sensitive layer is in the range of 0.05 to 90% by weight with respect to the total weight of said layer, and preferably in the range of 5 to 70% by weight.

The preferred porphyrin pigment content in a charge generating layer is in the range 30 to 70% by weight with respect to the total weight of said layer. The light-sensitive layer is preferably less than 30 $\mu$m thick and the charge generating layer is preferably less than 5 $\mu$m thick, more preferably is less than 2 $\mu$m thick.

In a preferred embodiment for the production of a recording material according to the present invention a charge transporting layer is coated on top of the charge generating layer. The thickness of the charge transport layer is preferably in the range of 5 to 50 $\mu$m, more preferably in the range of 5 to 30 $\mu$m.

p-type charge transporting layers may contain compounds substituted with electron-acceptor groups forming an intermolecular charge transfer complex with the p-type charge transporting compound. Useful compounds having electron-accepting groups are nitrocellulose and aromatic nitro-compounds such as nitrated fluorenone-9 derivatives, nitrated 9-dicyanomethylene-fluorenone derivatives, nitrated naphthalenes, chlorinated benzoquinones and nitrated naphthalic acid anhydrides or imide derivatives. The optimum concentration range of said derivatives is such that the molar donor-/acceptor ratio is 10:1 to 1,000:1 and vice versa.

The presence of one or more spectral sensitizing agents can have an advantageous effect on the charge transport. In that connection reference is made to the sensitizing dyes described in U.S. Pat. Nos. 3,832,171 and 4,028,102. Preferably these dyes are used In an amount not substantially reducing the transparency in the visible light region (420–750 nm) of the charge transporting layer so that the charge generating layer still can receive a substantial amount of the exposure light when exposed through the charge transporting layer.

Compounds acting as stabilising agents against deterioration by ultra-violet radiation, so-called UV-stabilizers, may also be incorporated in said charge transport layer. Examples of UV-stabilizers are benztriazoles.

For controlling the viscosity of the coating compositions and controlling their optical clarity silicone oils may be added to the charge transporting layer.

As charge transport compounds for use in a recording material according to the present invention any of the known charge transport compounds mentioned hereinbefore may be used. Particularly good results are obtained with the charge transport compounds used In the photoconductive recording materials described in our co-pending published European patent applications (EP-A) Nos. 347 960, 347 967 and 349 034 and unpublished European patent applications Nos. 89200707.1, 90200717.8, 90200968.7 and 90201600.5.

In some cases it may be advantageous to use a plasticizing agent in the charge generating and/or charge transporting layer, e.g. halogenated paraffin, polybiphenyl chloride, dimethylnaphthalene or dibutyl phthalate.

In the recording materials of the present invention an adhesive layer or barrier layer may be present between the charge generating layer and the support or the charge transport layer and the support. Useful for that purpose are e.g. a polyamide layer, nitrocellulose layer, hydrolysed silane layer, or aluminium oxide layer acting as blocking layer preventing positive or negative charge injection from the support side. The thickness of said barrier layer is preferably not more than 1 micron ($\mu$m).

The conductive support may be made of any suitable conductive material. Typical conductors include aluminium, steel, brass and paper and resin materials incorporating or coated with conductivity enhancing substances, e.g. vacuum-deposited metal, dispersed carbon black, graphite and conductive monomeric salts or a conductive polymer, e.g. a polymer containing quaternized nitrogen atoms as in Calgon Conductive polymer 261 (trade mark of Calgon Corporation, Inc., Pittsburgh, Pa., U.S.A.) described in U.S. Pat. No. 3,832,171.

The support may be in the form of a foil, web or be part of a drum.

An electrophotographic recording process according to the present invention comprises the steps of:

(1) overall electrostatically charging, e.g. with corona-device, the charge transporting layer or photosensitive charge generating layer of a two layer-system recording material of the present invention, or overall electrostatically charging the photosensitive layer of a monolayer recording material of the present invention, and (2) image-wise photo-exposing the photosensitive layer(s) of said recording material thereby obtaining a latent electrostatic image.

The photo-exposure of the photosensitive charge generating layer proceeds preferably through the charge transporting layer in the case of two layer recording materials with the charge generating layer underneath the charge transporting layer, but may be direct if the charge generating layer Is uppermost or may proceed likewise through the conductive support if the latter is transparent enough to the exposure light.

The development of the latent electrostatic image commonly occurs preferably with finely divided electrostatically attractable material, called toner particles that are attracted by coulomb force to the electrostatic charge pattern. The toner development Is a dry or liquid toner development known to those skilled in the art.

In positive-positive development toner particles deposit on those areas of the charge carrying surface which are in positive-positive relation to the original image. In reversal development, toner particles migrate and deposit on the recording surface areas which are in negative-positive Image relationship to the original. In the latter case the areas discharged by photo-exposure obtain by Induction through a properly biased developing electrode a charge of opposite charge sign with respect to the charge sign of the toner particles so that the toner becomes deposited in the photo-exposed areas that were discharged in the imagewise exposure (ref.: R.

M. Schaffert "Electrophotography"—The Focal Press-—London, N.Y., enlarged and revised edition 1975, p. 50-51 and T. P. Maclean "Electronic Imaging" Academic press—London, 1979, p. 231).

According to a particular embodiment electrostatic charging, e.g. by corona, and the imagewise photoexposure proceed simultaneously.

Residual charge after toner development may be dissipated before starting a next copying cycle by overall exposure and/or alternating current corona treatment.

The toner image obtained may be fixed onto the recording material or may be transferred to a receptor material to form thereon after fixing the final visible image.

A recording material according to the present invention showing a particularly low fatigue effect can be used in recording apparatus operating with rapidly following copying cycles including the sequential steps of overall charging, imagewise exposing, toner development and toner transfer to a receptor element.

The evacuations of electrophotographic properties determined on the recording materials of the following examples relate to the performance of the recording materials in an electrophotographic process with a reusable photoreceptor. The measurements of the performance characteristics were carried out as follows:

The photoconductive recording sheet material was mounted with its conductive backing on an aluminium drum which was earthed and rotated at a circumferential speed of 10 cm/s. The recording material was sequentially charged with a negative corona at a voltage of $-4.6$ kV operating with a corona current of about 1 $\mu$A per cm of corona wire. Subsequently the recording material was exposed (simulating image-wise exposure) with a particular light dose of "monochromatic light" (bandwidth=20 nm) obtained from a monochromator positioned at the circumference of the drum at an angle of 45° with respect to the corona source. The photoexposure lasted 200 ms. Thereupon, the exposed recording material passed an electrometer probe positioned at an angle of 180° with respect to the corona source.

After effecting an overall post exposure with a halogen lamp producing 27,000 mJ/m2 positioned at an angle of 270° with respect to the corona source a new copying cycle is started.

Each measurement relates to 100 copying cycles in which 10 cycles without light exposure are alternated with 5 cycles with light exposure.

The charging level (CL) is taken as the average charging level over the 90th to 100th cycle, the residual potential (RP) as the residual potential over the 85th to 90th cycle, the % discharge as $_{CL}(CL-RP) \times 100$ and the fatigue (F) as the difference in residual potential in volts between RP and the average residual potential over the 10th to 15th cycle.

For a given corona voltage, corona current, separating distance of the corona wires to recording surface and drum circumferential speed the charging level CL is only dependent upon the thickness of the charge transport layer and its specific resistivity. In practice CL expressed in volts should be preferably $\geq 30$ d, where d is the thickness in $\mu$m of the charge transport layer.

Under the applied exposure conditions, simulating practical copying conditions, using a charge transport layer in conjunction with a charge generating layer the % discharge should be at least 35% and preferably at least 50%. The fatigue F should preferably not exceed 20 V either negative or positive to maintain a uniform image quality over a large number of copying cycles.

The spectral sensitivity characteristics (reciprocal of the incident light exposure in mJ/m2 required to reduce the surface charge to half its initial value plotted against the wavelength of the incident light in nm) were measured by carrying out "sensitometric measurements" at particular wavelengths at intervals of 25 nm and interpolating from the resulting sensitometric curves (surface voltage plotted against exposure at a constant exposure time of 400 ms) the exposures corresponding to a reduction in surface voltage to half its initial value for the particular wavelengths. Said sensitometric measurements were carried out with the same apparatus as that used for the 100 copying cycle simulation experiments, but at a rotational circumference speed of 5 cm/s, a post-exposure of 54,000 mJ/m2 and over 40 cycles instead of a 100. Instead of using constant exposure the exposure was changed after each 5 cycles using grey filters with well-defined optical densities as follows:

first 5 cycles $I_o \times 0.4$ mJ/m2 (no grey filters)

second 5 cycles $[I_o \times 0.4 \times \log^{-1} 0.5]$ mJ/m2 (grey filter O.D.=0.5)

third 5 cycles $[I_o \times 0.4 \times \log^{-1} 1.0]$ mJ/m2 (grey filter O.D.=1.0)

fourth 5 cycles $[I_o \times 0.4 \times \log^{-1} 1.5]$ mJ/m2 (grey filter O.D.=1.5)

fifth 5 cycles $[I_o \times 0.4 \times \log^{-1} 2.0]$ mJ/m2 (grey filter O.D.=2.0)

sixth 5 cycles $[I_o \times 0.4 \times \log^{-1} 2.5]$ mJ/m2 (grey filter O.D.=2.5)

seventh 5 cycles $[I_o \times 0.4 \times \log^{-1} 3.0]$ mJ/m2 (grey filter O.D.=3.0)

eighth 5 cycles $[I_o \times 0.4 \times 0]$ mJ/m2 (shutter closed)

where $I_o$ in mW/m2 is the primary light intensity.

The absorption spectra of the charge generating pigments according to formula (1) were determined by casting the pigments in a thin layer with bisphenol A polycarbonate as binder and measuring the relative absorption ($\alpha$) in transmission with a MATCHSCAN spectrophotometer (MATCHSCAN is a registered trade name).

The X-ray diffraction spectra were measured with a PHILIPS X-ray diffractometer with a Cu $k_\alpha$ X-ray source and a variable slit producing an exposed area of sample independent of the angle of incidence of the X-ray source.

The following examples further illustrate the present invention. All ratios and percentages mentioned in the Examples are by weight.

EXAMPLE 1

Preparation of metal-free tetrabenzotriazaporphyrin (compound 1 in Table 1) in $\beta$- and $\omega$-crystal modification.

A) Preparation of 1-amino-3-nitromethylene-isoindole

A mixture of 72.5 g of aminoimino-isoindolenine, 81 ml of nitromethane and 400 ml of methanol were heated under reflux for 12 hours. 62 g of 1-amino-2-nitromethylene-isoindole was obtained by filtering the resulting cooled suspension. Yield: 66%.

B) Preparation of metal-free tetrabenzotriazaporphyrin in the $\beta$-modification.

Figure 1B:
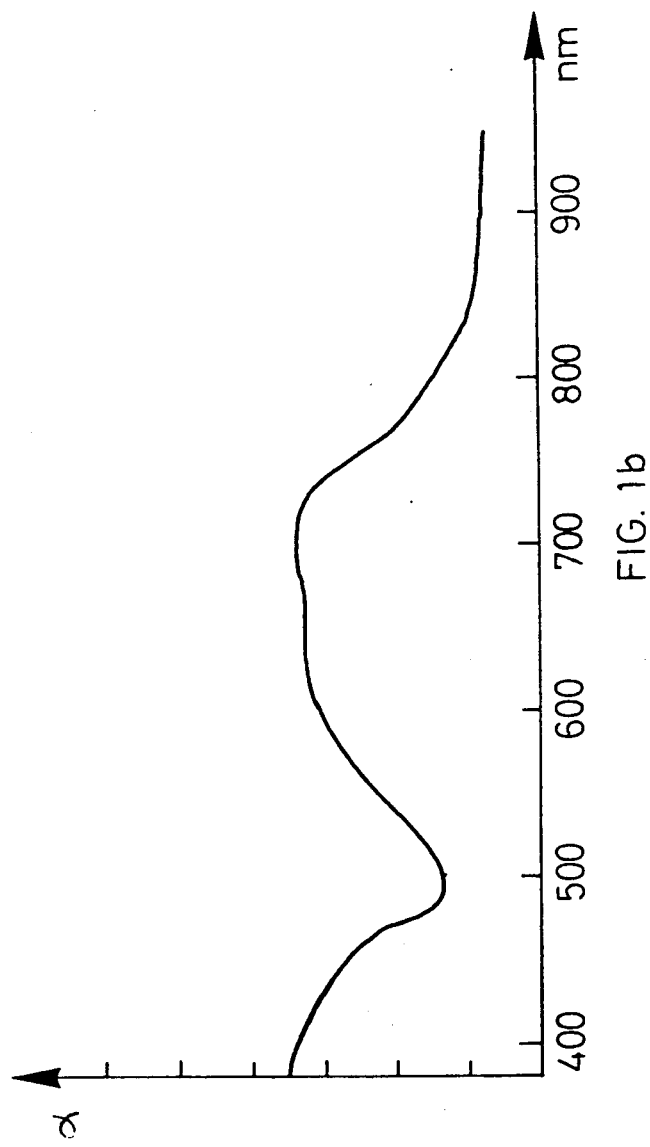

A suspension of 145 g of aminoiminoisoindolenine and 189 g of 1-amino-3-nitromethylene-isoindole in 700 ml of nitrobenzene were added gradually over a period of 30 minutes to 500 ml of nitrobenzene heated to 180° C. The water formed together with about 100 ml of nitrobenzene was continually distilled off. The crystals obtained were filtered cold and thoroughly washed with dimethylformamide and methanol. 102 g of metal free tetrabenzotriazaporphyrin in the β-crystalline modification was obtained. This modification is characterized by an absorption spectrum as shown in FIG. 1b and by an X-ray diffraction pattern exhibiting strong lines at Bragg angles (2θ) of 7.0; 8.9; 17.9; 20.3; 23.7; 26.0; 26.8; 27.7 and 30.0 degrees.

C) Preparation of metal-free tetrabenzotriazaporphyrin in the ω-modification (compound 1 in Table 1)

Figure 1D:
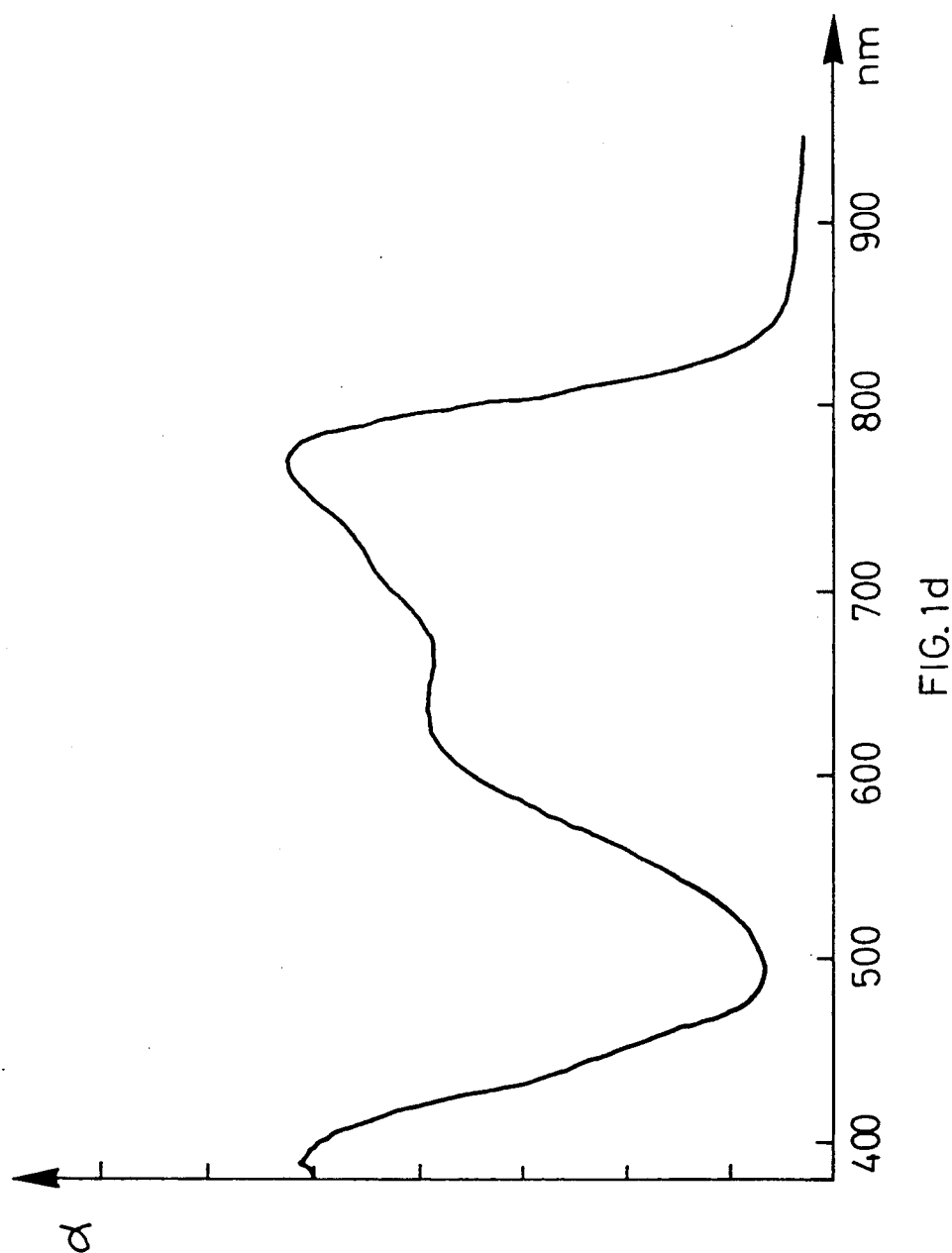
FIGS. 1d and 1e represent absorption spectra of ω-crystalline modifications respectively of metal-free tetrabenzotriazaporphyrin after treatment with hot methyl benzoate and hot xylene respectively.

The ω-crystalline modification was obtained from the β-modification by grinding 10 g of the β-crystalline modification with 90 g of sodium chloride and 600 g of steel grinding balls for 10 hours in a vibratory mill after which it was stirred with hot water and washed free of salt. 9.9 g of the metal-free tetrabenzotriazaporphyrin predominantly in the ω-modification were obtained (X-ray diffraction analysis showed that small quantities of the β-modification were still present). Metal-free tetrabenzotriazaporphyrin which according to its X-ray diffraction pattern was entirely in the ω-modification (absence of peaks at Bragg to angles (2θ) of about 6.9 and about 8.8 degrees) was obtained by heating the ω-modification product still containing some β-modification with methylbenzoate at 100° C. for 10 hours. This treatment also enhanced the relative Intensity of the absorption in the 790 nm band as can be seen by comparing FIG. 1d and 1c.

The ω-modification is characterized by an absorption spectrum different from the α- and β-modifications (see FIGS. 1a, 1b and 1c for the α-, β- and ω-modifications respectively) and by an X-ray diffraction pattern exhibiting strong lines at Bragg angles (2θ) of 8.5; 10.2; 11.9; 14.4; 18.0; 20.4; 22.6; 24.0; 24.7 and 29.8 degrees.

D) Alternative preparation of metal-free tetrabenzotriazaporphyrin in the ω-modification (compound 1 in Table 1)

The ω-crystalline modification was obtained from the β-modification by tempering 30 g of the β-crystalline modification with 450 ml of boiling α-methylnaphthalene for 24 hours. The resulting metal-free tetrabenzotriazaporphyrin was according to X-ray diffraction analysis exclusively in the ω-crystalline modification.

EXAMPLE 2

Figure 1E:
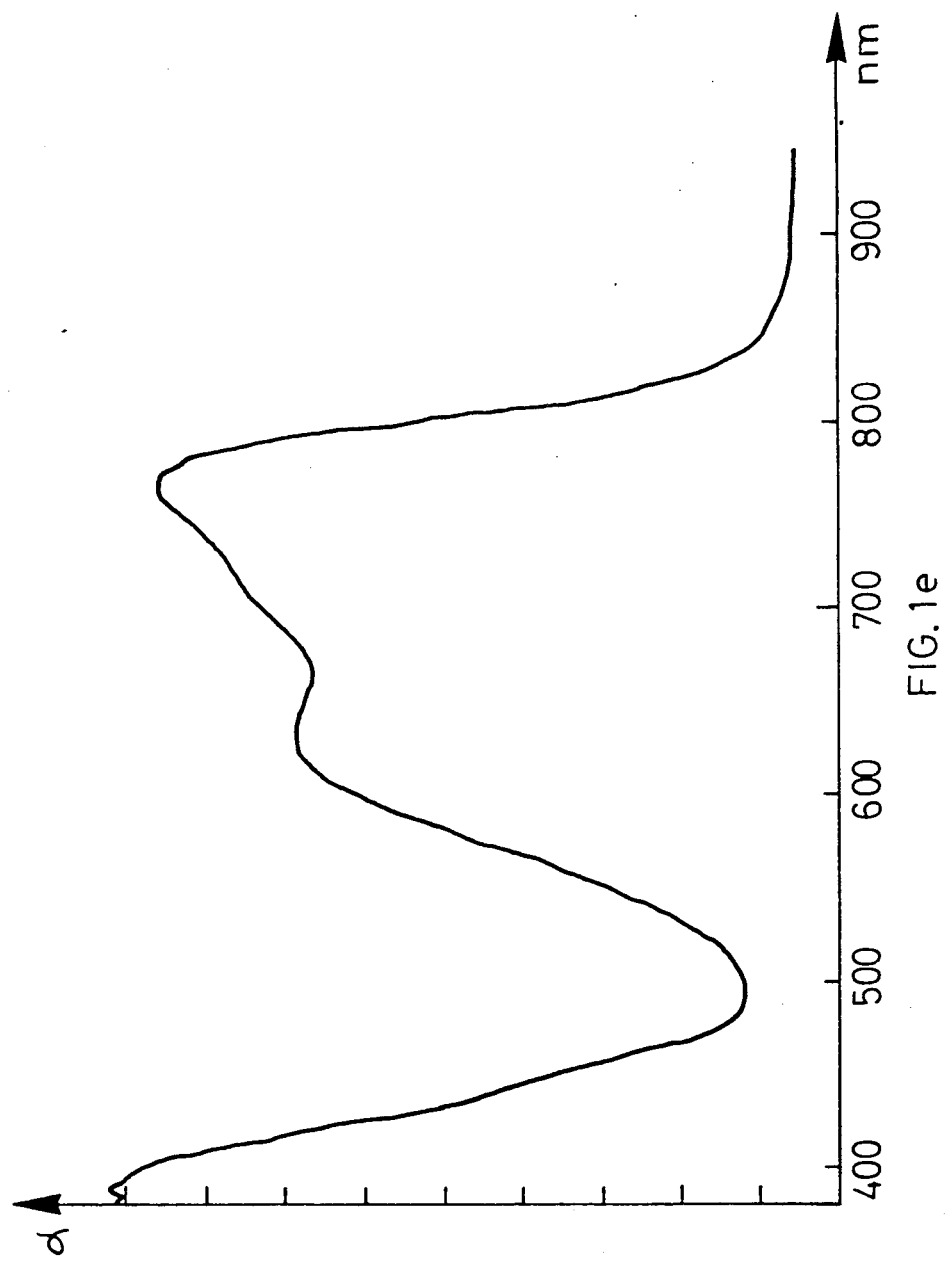

The ω-crystalline modification of metal-free tetrabenzotriazaporphyrin obtained by salt-grinding the β-crystalline modification as described in Example 1 was heated with xylene at 100° C. for 10 hours. This treatment reduced the concentration of unchanged β-modification present as seen by the decrease in relative intensity of the peaks at Bragg angles (2θ) of about 6.9 and about 8.8 degrees In its X-ray diffraction pattern. This treatment also enhanced the relative intensity of the absorption in the 790 nm band as can be seen by comparing the accompanying FIGS. 1e and 1c.

EXAMPLE 3

Preparation of metal-free tetrabenzotriazaporphyrin (compound 1 in Table 1) in the α-crystal modification from the β-crystal modification.

The α-crystalline modification of metal-free tetrabenzotriazaporphyrin was produced by dissolving 10 g of the β-crystalline modification produced as described in Example 1 in 100 g of concentrated sulfuric acid and by discharging the solution within 30 minutes into 900 ml of water. The obtained fine precipitate was filtered off, washed free of sulfate and dried at 50 ° C. in a forced air drying cupboard. 9.5 g of tetrabenzotriazaporphyrin In the α-crystalline modification were obtained, which modification is characterized by an absorption spectrum given in FIG. 1a and by an X-ray diffraction pattern exhibiting strong lines at Bangles (2θ) of 6.7, 13.6, 15.0, 24.5 and 26.9 degrees. A treatment in boiling water for 24 hours did not change the morphology of the α-modification product.

EXAMPLE 4

Preparation of metal-free tetrabenzotriazaporphyrin (compound 1 in Table 1) in the ω-crystal modification from the α-crystal modification.

The ω-crystalline modification of metal-free tetrabenzotriazaporphyrin was produced from the α-crystalline modification produced as described in Example 3 by suspending 9.5 g of the α-crystalline modification in 100 ml of methyl benzoate and stirring for 10 hours at 180 ° C. The suspension was then cooled, filtered and the product thoroughly washed with methanol and dried. 9 g of tetrabenzotriazaporphyrin in the ω-crystalline modification were obtained as characterized by a different absorption spectrum as shown in FIG. 1c and by an X-ray diffraction pattern exhibiting strong lines at Bragg angles (2θ) of 8.5; 10.2; 11.9; 14.4; 18.0; 20.4; 22.6; 24.0; 24.7 and 29.8 degrees.

EXAMPLE 5

A photoconductor sheet was produced by coating a 100 μm thick polyester film vapour-coated with a conductive layer of aluminium successively with a hydrolyzed silane adhesive layer, a dispersion of charge generating pigment to a thickness of 0.6 μm and a filtered solution of charge transport substance and binder to a thickness of 14 μm. The coating proceeded in each case with a doctor-blade coater.

The hydrolyzed silane adhesive layer was prepared by coating a 1% by weight solution of γ-aminopropyl triethoxy silane on the aluminized polyester substrate and hydrolyzing/polymerizing it at 100° C. for 30 minutes.

The charge generating pigment dispersion was prepared by mixing 1 g of the ω-modification of metal-free tetrabenzotriazaporphyrin prepared as described in example 2, 1.5 g of MAKROLON CO 2000 (registered trade mark) and 22.5 g of dichloromethane for 20 minutes in a pearl mill, which dispersion was cast without further dilution with dichloromethane. Said layer was dried for 15 minutes at 80° C. prior to transport layer overcoating with a filtered solution of 2 g of 1,2-bis(1,2-dihydro-2,2,4-trimethyl-quinolin-1-yl)ethane, 2 g of MAKROLON 5700 (registered trade mark) and 26.6 g of dichloromethane. This layer was then dried for 16 hrs at 50° C.

The characteristics of the thus obtained photoconductive recording material were determined with a light dose of 10.35 mJ/m2 of 780 nm light as described above with the following results:
CL = −484 V
RP = −135V
% discharge = 72.1

EXAMPLE 6

A photoconductive recording material was produced as described in Example 5 except that the charge transport layer consisted of 40% by weight of tris(p-tolyl)amine in MAKROLON 5700 (registered trade mark) instead of 50% by weight of 1,2-bis(1,2-dihydro-2,2,4-trimethyl-quinolin-1-yl)ethane in MAKROLON 5700 (registered trade mark).

The characteristics of the thus obtained photoconductive recording material were determined with a light dose of 10.35 mJ/m2 of 780 nm light as described above with the following results:
CL = −351 V
RP = −82 V
% discharge = 76.6

EXAMPLE 7

A photoconductor sheet was produced by coating a 100 μm thick polyester film vapour-coated with a conductive layer of aluminium successively with a dispersion of charge generating pigment to a thickness of 0.6 μm and a filtered solution of charge transport substance and binder to a thickness of 16 μm. The coating proceeded in each case with a doctor-blade coater.

The charge generating pigment dispersion was prepared by mixing 0.68 g of the ω-modification of metal-free tetrabenzotriazaporphyrin prepared as described in example 1, 1.43 g of MAKROLON CO 2000 registered trade mark), 0.16 g of DYNAPOL L206 (registered trade mark) and 20.43 g of dichloromethane for 5 minutes in a pearl mill, which dispersion was cast without further dilution with dichloromethane. Said layer was dried for 15 minutes at 80° C. prior to transport layer overcoating with a filtered solution of 4 g of 1,2-bis(1,2-dihydro-2,2,4-trimethyl-quinolin-1-yl)ethane, 4 g of MAKROLON CD 2000 (registered trade mark) and 42 g of dichloromethane. This layer was then dried for 16 h at 50° C.

The characteristics of the thus obtained photoconductive recording material were determined with a light dose of 10.35 mJ/m2 of 780 nm light as described above with the following results:
CL = −375 V
RP = −157 V
% discharge = 58.1

EXAMPLE 8

A photoconductive recording material was produced as described in Example 5 except that the ω-modification of metal-free tetrabenzotriazaporphyrin in the charge generation layer had been replaced by the β-modification of metal-free tetrabenzotriazaporphyrin prepared as described in Example 1.

The characteristics of the thus obtained photoconductive recording material were determined with a light dose of 26.4 mJ/m2 of 650 nm light as described above with the following results:
CL = −253 V
RP = −152 V
% discharge = 39.9

EXAMPLE 9

A photoconductive recording material was produced as described in Example 5 except that the charge generation material was the α-modification of compound 1 in Table 1 produced as described in Example 3 instead of the ω-modification.

The characteristics of the thus obtained photoconductive recording material were determined with a light dose of 26.4 mJ/m2 of 650 nm light as described above with the following results:
CL = −95 V
RP = −90 V
% discharge = 5.3

EXAMPLE 10

Copper tetrabenzotriazaporphyrin (compound 2 in Table 1) in the β-crystal modification was produced from metal-free tetrabenzotriazaporphyrin by first converting it with sodium metholate to disodium tetrabenzotriazaporphyrin and then reacting the disodium compound with copper acetate forming copper tetrabenzotriazaporphyrin.

Figure 3:
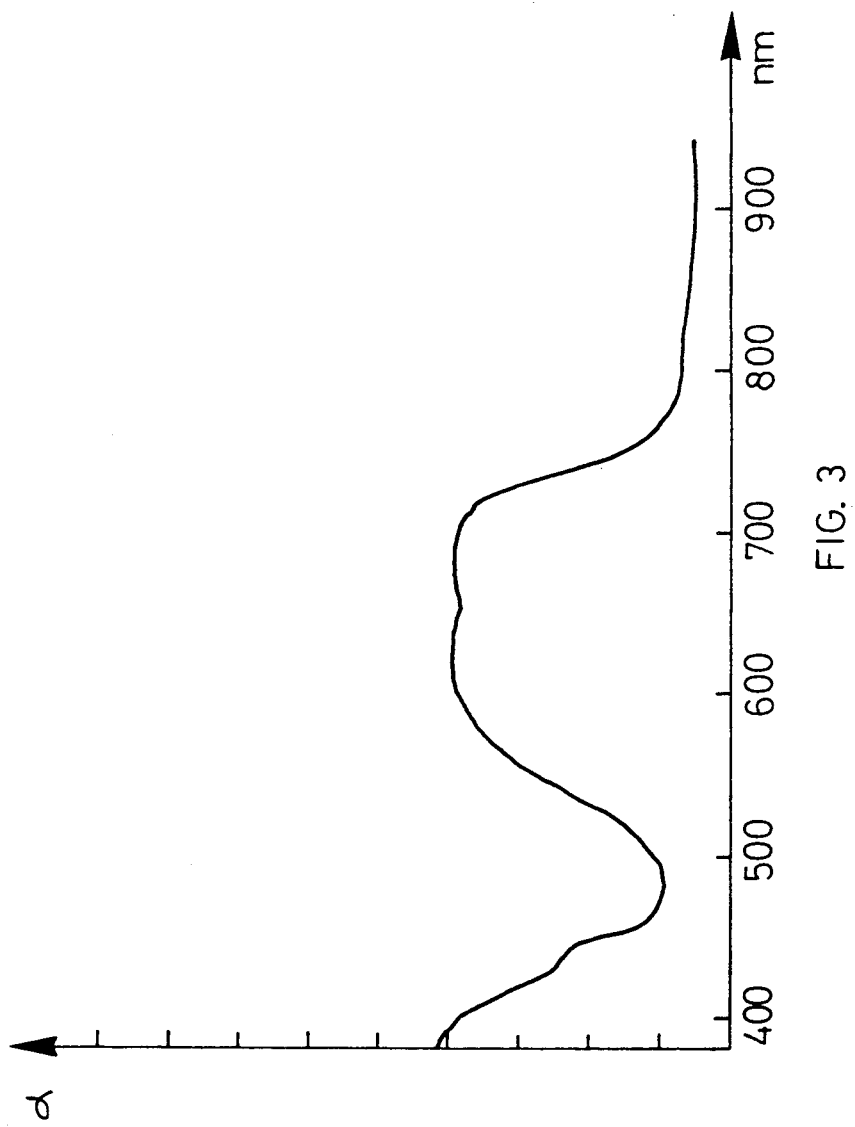
FIG. 3 represents the absorption spectrum of copper tetrabenzotriazaporphyrin in the β-crystalline modification.

The β-modification Is characterized by a distinct absorption spectrum (see FIG. 3) and an X-ray diffraction pattern exhibiting strong lines at Bragg angles (2θ) of 6.9; 9.0; 12.3; 18.0; 21.3; 23.6; 26.0; 27.8 and 30.2 degrees.

EXAMPLE 11

A photoconductive recording material was produced as described in Example 6 except that the charge generation material was the β-modification of compound 2 in Table 1 Instead of the β-modification of compound 1 in Table 1. Said charge generation material had been prepared as described in Example 10.

The characteristics of the thus obtained photoconductive recording material were determined with a light dose of 26.4 mJ/m2 of 650 nm light as described above with the following results:
CL = −528 V
RP = −475 V
% discharge = 10.0

EXAMPLE 12

A photoconductive material was produced as described In Example 5 except that the adhesive layer was prepared by coating a 3% by weight solution of γ-aminopropyltriethoxysilane instead of a 1% by weight solution, the ω-modification of metal-free tetrabenzotriazaporphyrin used was prepared as described in example 10 rather than as described in example 2 and the charge generating pigmented dispersion was mixed for 16 hours in a ball mill rather than 20 minutes in a pearl mill.

The characteristics of the thus obtained photoconductive recording material were determined with a light dose of 20.7 mJ/m2 of 780 nm light as described with the following results:
CL = −534 V
RP = −103 V
% discharge = 80.7

EXAMPLE 13

A photoconductive material was produced as described in Example 12 except that α,α'-bis(6-ethoxy-1,2-dihydro-2,2,4-trimethyl-quinolin-1-yl)p-xylene was used as the charge transport material instead of 1,2-bis(1,2-dihydro-2,2,4-trimethylquinolin-1-yl)ethane.

The characteristics of the thus obtained photoconductive recording material were determined with a light dose of 20.7 mJ/m2 of 780 nm light as described above with the following results:
CL = −532 V
RP = −95 V
% discharge = 82.1

EXAMPLE 14

A photoconductive material was produced as described in Example 12 except that α,α'-bis(6-methoxy-1,2-dihydro-2,2,4-trimethyl-quinolin-1-yl)p-xylene was used as the charge transport material instead of 1,2-bis(1,2-dihydro-2,2,4-trimethyl-quinolin-1-yl)ethane.

The characteristics of the thus obtained photoconductive recording material were determined with a light dose of 20.7 mJ/m2 of 780 nm light as described above with the following results:
CL = −476 V
RP = −84 V
% discharge = 82.4

EXAMPLE 15

A photoconductive material was produced as described in Example 12 except that 6-formyl-1,2-dihydro-1,2,2,4-tetramethyl-quinoline-1',1'-diphenyl hydrazone was used as the charge transport material instead of 1,2-bis(1,2-dihydro-2,2,4-trimethyl-quinolin-1-yl)ethane.

The characteristics of the thus obtained photoconductive recording material were determined with a light dose of 20.7 mJ/m2 of 780 nm light as described above with the following results:
CL = −529 V
RP = −90 V
% discharge = 83.0

EXAMPLE 6

A photoconductive material was produced as described in Example 12 except that 1-benzyl-6-formyl-1,2-dihydro-2,2,4-trimethyl-quinoline-1'-α-naphthyl-1'-phenyl hydrazone was used as the charge transport material instead of 1,2-bis(1,2-dihydro-2,2,4-trimethyl-quinolin-1-yl)ethane.

The characteristics of the thus obtained photoconductive recording material were determined with a light dose of 20.7 mJ/m2 of 780 nm light as described above with the following results:
CL = −542 V
RP = −92 V
% discharge = 83.0

EXAMPLE 17

A photoconductive material was produced as described in Example 12 except that the charge transport layer consisted of 40 wt. % of N-(4-N,N-dibenzylaminophenyl)-carbazole and 60 wt. % of MAKROLON 5700 (registered trade mark) instead of 50 wt. % of 1,2-bis(1,2-dihydro-2,2,4-trimethyl-quinolin-1-yl)ethane and 50 wt. % of MAKROLON 5700 (registered trade mark).

The characteristics of the thus obtained photoconductive recording material were determined with a light dose of 20.7 mJ/m2 of 780 nm light as described above with the following results:
CL = −478 V
RP = −139 V
% discharge = 70.9

EXAMPLE 18

A photoconductive material was produced as described in Example 12 except that 1,3,5-tris4-bis(4'-ethylphenyl)-aminophenyl]-benzene was used as the charge transport material instead of 1,2-bis(1,2-dihydro-2,2,4-trimethyl-quinolin-1-yl)-ethane.

The characteristics of the thus obtained photoconductive recording material were determined with a light dose of 20.7 mJ/m2 of 780 nm light as described above with the following results:
CL = −462 V
RP = −82 V
% discharge = 82.3

EXAMPLE 19

A photoconductive material was produced as described in Example 12 except that 1,3,5-tris(4-ethyl-benzyl-aminophenyl)-benzene was used as the charge transport material instead of 1,2-bis(1,2-dihydro-2,2,4-trimethyl-quinolin-1-yl)ethane.

The characteristics of the thus obtained photoconductive recording material were determined with a light dose of 20.7 mJ/m2 of 780 nm light as described above with the following results:
CL = −563 V
RP = −130 V
% discharge = 76.9

EXAMPLE 20

A photoconductive material was prepared as described in Example 12 except that 1,3,5-tris[4-N,N-bis(4'-methoxy phenyl)amino-phenyl]-benzene was used as the charge transport material instead of 1,2-bis(1,2-dihydro-2,2,4-trimethyl-quinolin-1-yl)ethane.

The characteristics of the thus obtained photoconductive recording material were determined with a light dose of 20.7 mJ/m2 of 780 nm light as described above with the following results:
CL = −304 V
RP = −80 V
% discharge = 73.7

EXAMPLE 21

A photoconductive material was produced as described in Example 12 except that bis(1,2-dihydro-1,2,2,4-tetramethyl quinolin-6-yl)phenyl methane was used as the charge transport material instead of 1,2-bis(1,2-dihydro-2,2,4-trimethyl-quinolin-1-yl)ethane.

The characteristics of the thus obtained photoconductive recording material were determined with a light dose of 20.7 mJ/m2 of 780 nm light as described above with the following results:
CL = −580 V
RP = −99 V
% discharge = 82.9

EXAMPLE 22

A photoconductive material was produced as described in Example 12 except that bis(1-benzyl-1,2-dihydro-2,2,4,7-tetramethyl-quinolin-6 yl) phenyl methane was used as the charge transport material instead of 1,2-bis(1,2-dihydro-2,2,4-trimethyl-quinolin-1-yl)ethane. The characteristics of the thus obtained photoconductive recording material were determined with a light dose of 20.7 mJ/m2 of 780 nm light as described above with the following results:

CL= −434 V
RP= −121 V
% discharge=72.1

EXAMPLE 23

A photoconductive material was produced as described in Example 12 except that α-(1,2-dihydro-2,2,4,7-tetramethyl quinoline-1-yl)-1-methyl naphthalene was used as the charge transport material instead of 1,2-bis(1,2-dihydro-2,2,4-trimethyl quinolin-1-yl)ethane.

The characteristics of the thus obtained photoconductive recording material were determined with a light dose of 20.7 mJ/m2 of 780 nm light as described above with the following results:

CL= −542 V
RP= −102 V
% discharge=81.2

EXAMPLE 24

A photoconductive material was produced as described in Example 12 except that α-(1,2-dihydro-2,2,4,6-tetramethyl quinoline-1-yl)-1-methyl naphthalene was used as the charge transport material instead of 1,2-bis(1,2-dihydro-2,2,4-trimethyl-quinolin-1-yl)ethane.

The characteristics of the thus obtained photoconductive recording material were determined with a light dose of 20.7 mJ/m2 of 780 nm light as described above with the following results:

CL= −522 V
RP= −92 V
% discharge=82.4

EXAMPLE 25

A photoconductive material was produced as described in Example 12 except that α-(6-formyl-1,2-dihydro-2,2,4-trimethyl quinolin-1-yl)-1methyl naphthalene-1',1'-diphenyl hydrazone instead of 1,2-bis(1,2-dihydro-2,2,4-trimethyl quinolin-1-yl)ethane.

The characteristics of the thus obtained photoconductive recording material were determined with a light dose of 20.7 mJ/m2 of 780 nm light as described above with the following results:

CL= −411 V
RP= −75 V
% discharge=81.8

EXAMPLE 26

A photoconductive material was produced as described in Example 12 except that the charge transport material used has the formula:

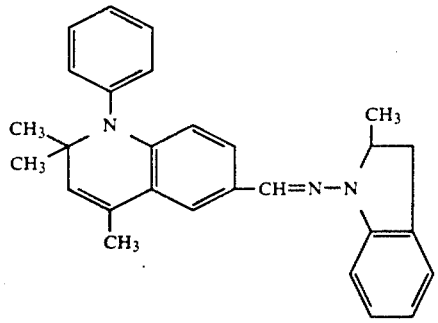

instead of 1,2-bis(1,2-dihydro-2,2,4-trimethyl-quinolin-1-yl)ethane.

The characteristics of the thus obtained photoconductive recording material were determined with a light dose of 20.7 mJ/m2 of 780 nm light as described above with the following results:

CL= −374 V
RP= −49 V
% discharge=86.9

EXAMPLE 27

A photoconductive material was produced as described in Example 12 except that the charge transport material used has the formula:

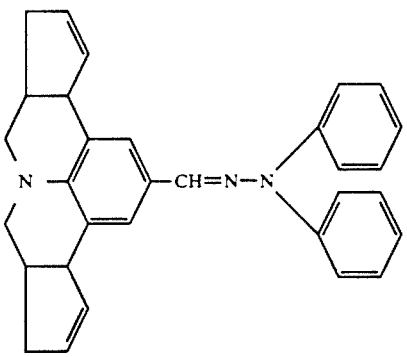

instead of 1,2-bis(1,2-dihydro-2,2,4-trimethylquinolin-1-yl)ethane.

The characteristics of the thus obtained photoconductive recording material were determined with a light dose of 20.7 mJ/m2 of 780 nm light as described above with the following results:

CL= −592 V
RP= −177 V
% discharge=70.1

EXAMPLE 28

A photoconductive material was produced as described in Example 17 except that tris(p-tolyl)amine was used as the charge transport material instead of N-(4-dibenzylaminophenyl)carbazole.

The characteristics of the thus obtained photoconductive recording material were determined with a light dose of 20.7 mJ/m2 of 780 nm light as described above with the following results:

CL= −498 V
RP= −96 V
% discharge=80.7

EXAMPLE 29

A photoconductive material was produced as described in Example 17 except that 4,4'bis(N-phenyl-N-m-tolyl) benzidine was used as the charge transport material instead of N-(4-dibenzylaminophenyl) carbazole.

The characteristics of the thus obtained photoconductive recording material were determined with a light dose of 20.7 mJ/m2 of 780 nm light as described above with the following results:
CL= −469 V
RP= −72 V
% discharge=84.6

EXAMPLE 30

A photoconductive material was produced as described in Example 12 except that 1,1-bis(4-diethylaminophenyl)4,4-diphenyl butadiene was used as the charge transport material instead of 1,2-bis (1,2-dihydro-2,2,4-trimethyl quinolin-1-yl) ethane.

The characteristics of the thus obtained photoconductive recording material were determined with a light dose of 20.7 mJ/m2 of 780 nm light as described above with the following results:
CL= −463 V
RP= −62 V
% discharge=86.6

EXAMPLE 31

A photoconductive material was produced as described in Example 12 except that 4-N,N-diphenylamino benzaldehyde-1',1'-diphenyl hydrazone was used as the charge transport material instead of 1,2-bis(1,2-dihydro-2,2,4-trimethyl-quinolin-1-yl) ethane.

The characteristics of the thus obtained photoconductive recording material were determined with a light dose of 20.7 mJ/m2 of 780 nm light as described above with the following results:
CL= −494 V
RP= −156 V
% discharge=68.4

EXAMPLE 32

A photoconductive material was produced as described in Example 12 except that p-diethylaminobenzaldehyde-1',1'-diphenyl-hydrazone was used as the charge transport material instead of 1,2-bis(1,2-dihydro-2,2,4-trimethyl-quinolin-1-yl) ethane.

The characteristics of the thus obtained photoconductive recording material were determined with a light dose of 20.7 mJ/m2 of 780 nm light as described above with the following results:
CL= −563 V
RP= −114 V
% discharge=79.8

EXAMPLE 33

A photoconductive material was produced as described in Example 12 except that 3-formyl-N-ethylcarbazole-1'-methyl-1'-phenyl-hydrazone was used as the charge transport material instead of 1,2-bis(1,2-dihydro-2,2,4-trimethyl-quinolin-1-yl)-ethane.

The characteristics of the thus obtained photoconductive recording material were determined with a light dose of 20.7 mJ/m2 of 780 nm light as described above with the following results:
CL= −487 V
RP= −99 V
% discharge=79.7

EXAMPLE 34

A photoconductive material was produced as described in Example 12 except that 4-dibenzylamino-2-methyl-benzaldehyde-1',1'-diphenyl hydrazone was used as the charge transport material instead of 1,2-bis(1,2-dihydro-2,2,4-trimethyl-quinolin-1-yl) ethane.

The characteristics of the thus obtained photoconductive recording material were determined with a light dose of 20.7 mJ/m2 of 780 nm light as described above with the following results:
CL= −497 V
RP= −89 V
% discharge=82.1

EXAMPLE 35

A photoconductive material was produced as described in Example 12 except that bis(4-diethyl amino-2-methyl-phenyl)-phenyl-methane was used as the charge transport material instead of 1,2-bis(1,2-dihydro-2,2,4-trimethyl-quinolin-1-yl) ethane.

The characteristics of the thus obtained photoconductive recording material were determined with a light dose of 20.7 mJ/m2 of 780 nm light as described above with the following results:
CL= −634 V
RP= −190 V
% discharge=70.0

EXAMPLE 36

A photoconductive material was produced as described in Example 12 except that 2,5-bis(4-diethylaminophenyl)-1,3,4-oxdiazole was used as the charge transport material instead of 1,2-bis(1,2-dihydro-2,2,4-trimethylquinolin-1-yl) ethane.

The characteristics of the thus obtained photoconductive recording material were determined with a light dose of 20.7 mJ/m2 of 780 nm light as described above with the following results:
CL= −591 V
RP= −155 V
% discharge=73.8

EXAMPLE 37

The ω-modification of metal free tetrabenzotriazaporphyrin used in the production of the photoconductive recording material of Example 37 was prepared as follows: β-metal free tetrabenzotriazaporphyrin prepared as described in Example 18 was recrystallized from 1-methyl naphthalene, then salt-ground as described in Example 1C and finally treated with distilled water for 10 hours under reflux.

The photoconductive recording material of Example 37 was produced by first coating a 100 μm thick polyester film vapour-coated with a conductive layer of aluminium with a 1% by weight solution of γ-aminopropyl-triethoxy-silane and hydrolyzing/polymerizing the resulting layer at 100° C. for 30 minutes, thereby forming an adhesive layer. This adhesive layer was then coated to a thickness of 13 μm with a dispersion of 0.75 g of ω-metal-free tetrabenzotriazaporphyrin (produced as described above) in a solution of 0.075 g phenanthraquinone and 6,67 g of MAKROLON CO 2000 (registered trade mark) in 30.385 g of dichloromethane after mixing for 20 minutes in a pearl mill. The layer was then dried for 16 hours at 50° C.

The thus obtained photoconductive recording material was positively charged and sensitometric measurements carried out at a wavelength of 780 nm as described above.

A very steep sensitometric curve was observed. The sensitivity to monochromatic 780 nm light exposure is expressed as that exposure ($I_{780}t$) required to achieve a residual potential of +100 V and the steepness of the discharge exposure dependence is expressed as the $\Delta\%$ discharge observed between ($I_{780}$ t)'s of 6.56 and 20.7 mJ/m2, a factor of 3.16 difference in exposure. The results are summarized below:

CL = −805 V $I_{780}t \rightarrow +100$ V = 100 mJ/m2

$\Delta\%$ discharge between $I_{780}t$'s of 6.56 and 20.7 mJ/m2 = 58.8

EXAMPLE 38

The $\omega$-modification of metal Free tetrabenzotriazaporphyrin used in the production of the photoconductive recording material of Example 38 was prepared as follows: $\omega$-metal-free tetrabenzotriazaporphyrin prepared as described in Example 10 was ground in a polyethylene glycol-water mixture for 1 hour in a pearl mill using 0.4 to 0.5 mm diameter glass beads.

The photoconductive recording material of Example 38 was produced by coating a 100 $\mu$m thick polyester film vapour-coated with a conductive layer of aluminium to a thickness of 13 $\mu$m with a dispersion of $\omega$-metal-free tetrabenzotriazaporphyrin (produced as described above) in a solution of MAKROLON CD2000 (registered trade mark) and DYNAPOL L206 (registered trade mark) in dichloromethane. This dispersion was prepared by first mixing 1.5 g of $\omega$-metal-free tetrabenzotriazaporphyrin, 1.14 9 of MAKROLON CD 2000 (registered trade mark) and 14.96 g of dichloromethane for 15 minutes in a pearl mill, then adding 6.51 g of MAKROLON CD 2000 (registered trade mark), 0.85 g of DYNAPOL L206 (registered trade mark) and 29.449 of dichloromethane and mixing in the pearl mill for a further 5 minutes after which 8.95 g of dichloromethane was evaporated off to produce the required casting viscosity. The layer was then dried for 16 hours at 50° C.

The thus obtained photoconductive recording material was positively charged and sensitometric measurements carried out at a wavelength of 780 nm as described above. A very steep sensitometric curve was observed. The sensitivity to monochromatic 780 nm light is expressed as the % discharge for an exposure ($I_{780}t$) of 6.56 mJ/m2 and the steepness of the discharge-exposure dependence is expressed as the $\Delta\%$ discharge observed between ($I_{780}$ t)'s of 20.7 mJ/m2 and 6.56 mJ/m2, a factor of 3.16 difference in exposure. The results are summarized below:

CL = +911 V

% discharge at $I_{780}t$ of 6,56 mJ/m2 = 92.5

$\Delta\%$ discharge between $I_{780}t$'s of 2.07 and 6.56 mJ/m2 = 90.5

EXAMPLE 39

The photoconductive recording material of Example 39 was produced by first coating a 100 $\mu$m thick polyester film vapour-coated with a conductive layer of aluminium with a 3% by weight solution of $\gamma$-aminopropyl-triethoxy-silane and hydrolyzing/polymerizing the resulting layer at 100° C. for 30 minutes, thereby forming an adhesive layer. This adhesive layer was then coated to a thickness of 15 $\mu$m with a dispersion of $\omega$-metal-free tetrabenzotriazaporphyrin (produced as described in Example 38) in a solution of MAKROLON CD 2000 (registered trade mark) in dichloromethane. This dispersion was prepared by first mixing 2 g of $\omega$-metal-free tetrabenzotriazaporphyrin, 1.7 g of MAKROLON CD 2000 (registered trade mark) and 20.97 g of dichloromethane for 15 minutes in a pearl mill, then adding 9.633 g of MAKROLON CD 2000 (registered trade mark) and 38.537 g of dichloromethane and mixing in the pearl mill for a further 5 minutes after which 12.23 g of dichloromethane was evaporated off to produce the required casting viscosity. The layer was then dried for 16 hours at 50° C.

The thus obtained photoconductive recording material was positively charged and sensitometric measurements carried out at a wavelength of 780 nm as described above. A very steep sensitometric curve was observed. The sensitivity to monochromatic 780 nm light is expressed as the % discharge for an exposure ($I_{780}t$) of 6.56 mJ/m2 and the steepness of the discharge-exposure dependence is expressed as the $\Delta\%$ discharge observed between ($I_{780}t$)'s of 20.7 mJ/m2 and 6.56 mJ/m2, a factor of 3.16 difference in exposure. The results are summarized below:

CL = +1065 V

% discharge at $I_{780}t$ of 6.56 mJ/m2 = 91.4

$\Delta\%$ discharge between $I_{780}t$'s of 20.7 and 6.56 mJ/m2 = 82.7

EXAMPLE 40

The $\omega$-metal-free tetrabenzotriazaporphyrin used in the production of the photoconductive recording material of Example 40 was prepared as described in Example 38 except that the pigment was ground twice For 1 hour in a pearl mill using 0.4 to 0.5 mm diameter glass beads in a polyethylene glycol-water mixture.

The photoconductive recording material of Example 40 was prepared as described for Example 39 except that the $\omega$-metal-free tetrabenzotriazaporphyrin used was produced as described above, its concentration was 20% by weight instead of 15% by weight, MAKROLON 2808 (registered trade mark) was used instead of MAKROLON CD 2000 (registered trade mark) and the layer thickness was 12 $\mu$m instead of 15 $\mu$m.

The thus obtained photoconductive recording material was positively charged and sensitometric measurements carried out as described above. A very steep sensitometric curve was observed. The sensitivity to monochromatic 780 nm light is expressed as the % discharge for an exposure ($I_{780}t$) of 6.56 mJ/m2 and the steepness of the discharge-exposure dependence is expressed as the $\Delta\%$ discharge observed between ($I_{780}t$)'s of 2.07 mJ/m2 and 6.56 mJ/m2, a factor of 3.16 difference in exposure. The results are summarized below:

CL = +849 V

% discharge at $I_{780}t$ of 6.56 mJ/m2 = 93.4

% discharge between $I_{780}t$'s of 2.07 and 6.56 mJ/m2 = 81.5

EXAMPLE 41

Figure 4:
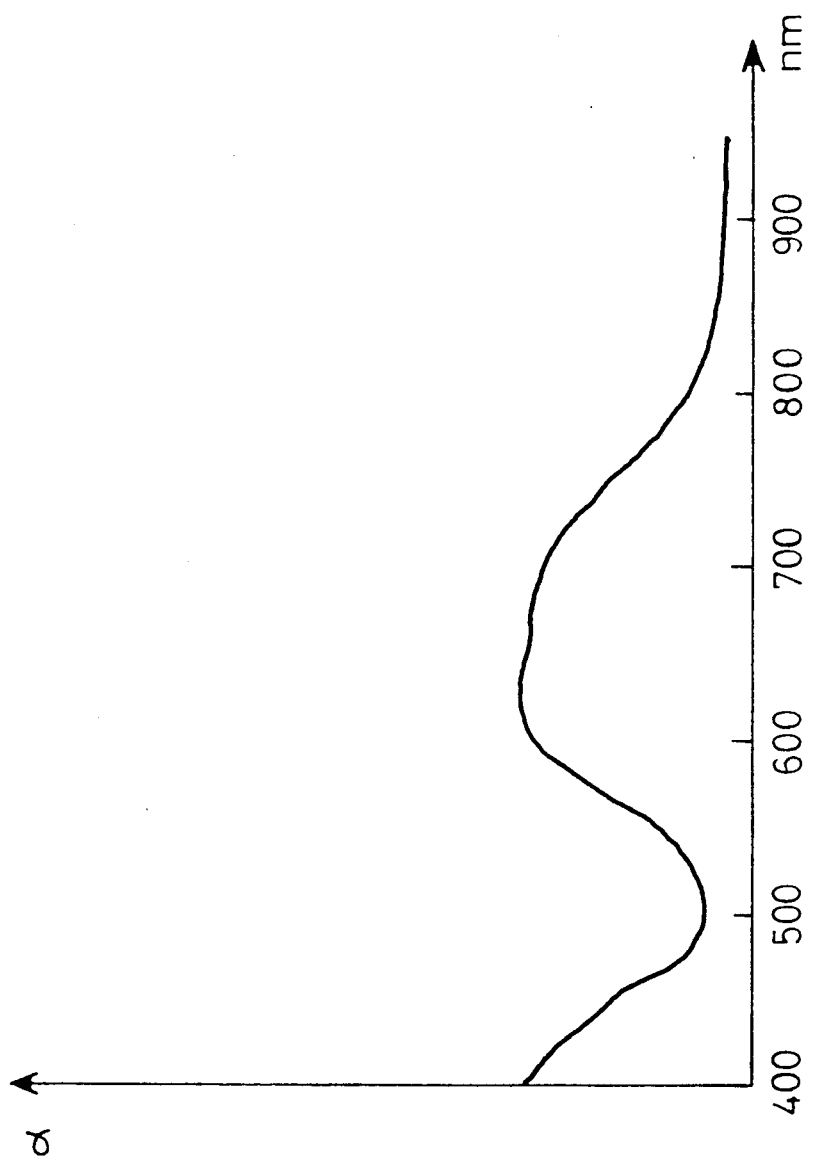
FIG. 4 represents the absorption spectrum of brominated copper tetrabenzotriazaporphyrin as described in Example 41.

Copper tetrabenzotriazaporphyrin prepared as described in Example 10 was brominated using the procedure described in Example 12 of U.S. Pat. No. 2,166,240. The resulting pigment was then salt-ground as described in Example 1C. The salt ground pigment has an XRD spectrum characterized by 2θ peaks at 26.3° (very strong), 30.9°, 40.5°, 47.6° and 50.7° and the absorption spectrum in a 50% by weight concentration in a 9:1 by weight mixture of MAKROLON CD 2000 (registered trade mark) and DYNAPOL L206 (registered trade mark) shown in FIG. 4.

A photoconductive recording material was produced by sequentially coating a 100 μm thick polyester film vapour-coated with a conductive layer of aluminium with a dispersion of brominated copper tetrabenzotriazaporphyrin in a solution of MAKROLON CD 2000 (registered trade mark) and DYNAPOL L206 (registered trade mark) in dichloromethane forming a charge generating layer 0.6 μm thick and a solution of equal weights of 1,2-bis(1,2-dihydro-2,2,4-trimethylquinolin-1-yl) ethane and MAKROLON 5700 (registered trade mark) in dichloromethane forming a charge transport layer 15.4 μm thick.

The brominated copper tetrabenzotriazaporphyrin dispersion was prepared by mixing 1 g pigment, 1.25 g MAKROLON CD 2000 (registered trade mark), 0.15 g DYNAPOL L206 (registered trade mark) and 19.28 g dichloromethane For 20 minutes in a pearl mill.

The resulting photoconductive recording material was dried for 16 hours at 50° C.

The characteristics of the thus obtained photoconductive recording material were determined with a light dose of 26.4 mJ/m2 of 650 nm light as described above with the following results:

CL= −690 V
RP= −559 V
% discharge=19.0

EXAMPLE 42

Figure 5:
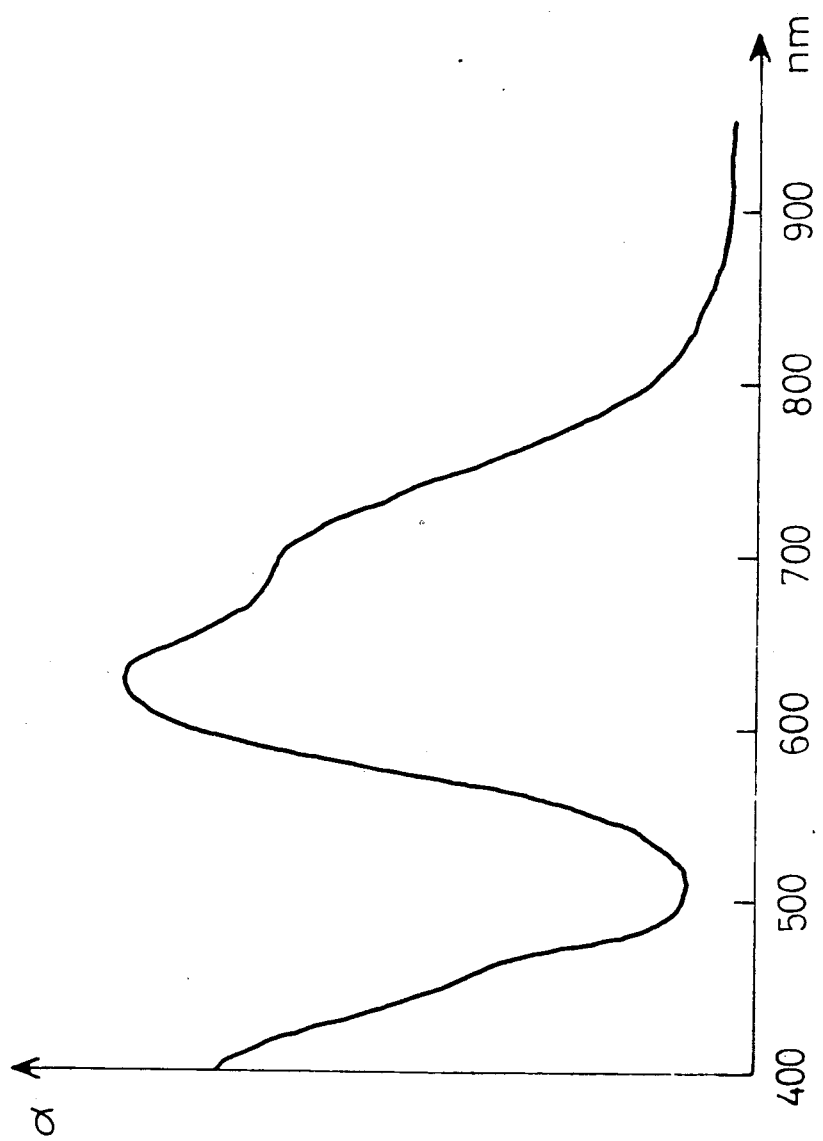
FIG. 5 represents the absorption spectrum of chlorinated copper tetrabenzotriazaporphyrin as described in Example 42.

Copper tetrabenzotriazaporphyrin prepared as described in Example 10 was chlorinated using the procedure described in Example 10 of U.S. Pat. No. 2,166,240. Elemental analysis was carried out on the resulting pigment with the following results: 6.2% Cu (AAS), 37.0% C; 1.1% H; 9.2% N and 45.1% Cl corresponding to 13 to 14 Cl atoms per molecule. The pigment was then subjected to salt-grinding as described in Example 1C. The salt ground pigment has an XR0 spectrum characterized by 2 peaks: at 5.7, 9.9, 13.3, 15.2, 16.4, 26.3 (very strong), 31.0, 33.7, 40.2, 42.6 and 47.1 degrees and the absorption spectrum in a 50% by weight concentration in a 9:1 by weight mixture of MAKROLON CD 2000 (registered trade mark) and DYNAPOL L206 (registered trade mark) shown in FIG. 5.

A photoconductive recording material was produced as described for Example 41 except that the pigment used was chlorinated copper tetrabenzotriazaporphyrin.

The characteristics of the thus obtained photoconductive recording material were determined with a light dose of 26.4 mJ/m2 of 650 nm light as described above with the following results:

CL= −357 V
RP= −243 V
% discharge=31.9

Figure 6:
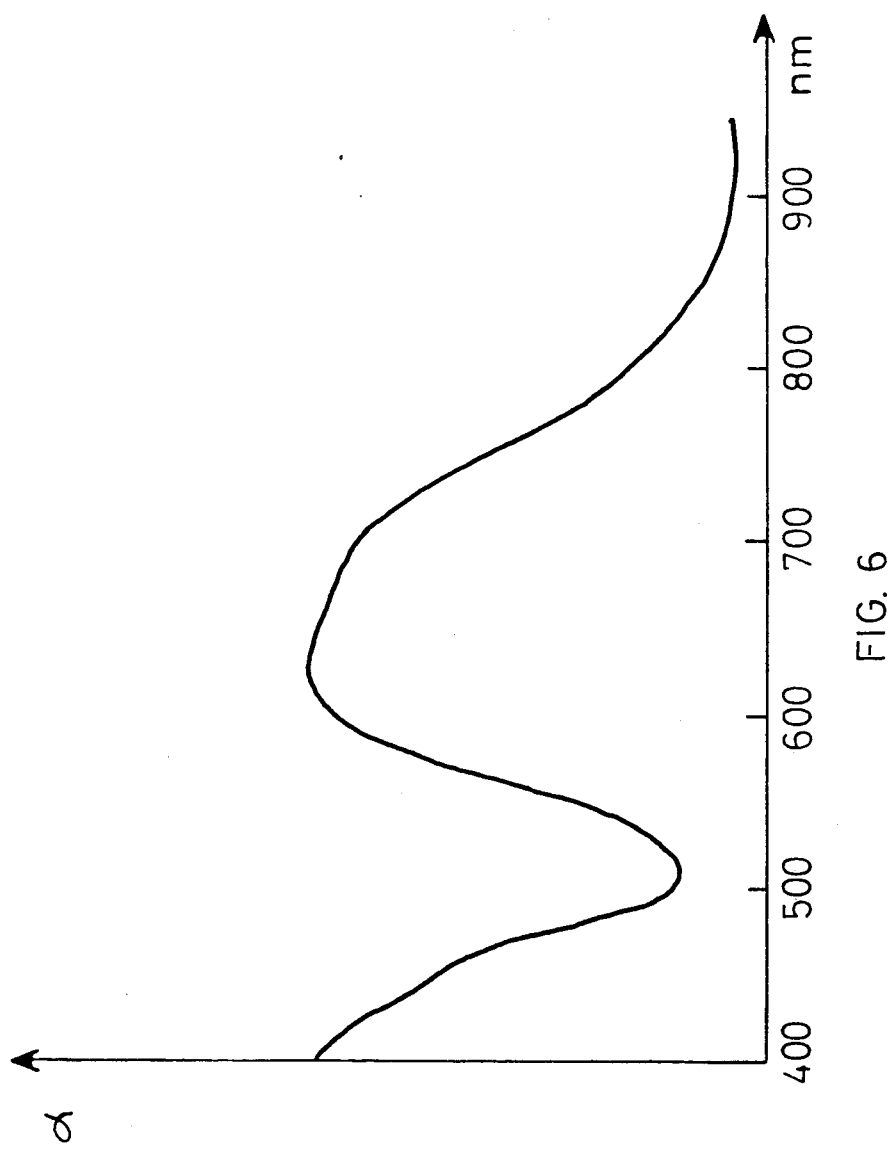
FIG. 6 represents the absorption spectrum of brominated metal-free tetrabenzotriazaporphyrin as described in Example 43.

EXAMPLE 43

β-Metal-free tetrabenzotriazaporphyrin prepared as described in Example 18 was brominated using the procedure described in Example 11 of U.S. Pat. No. 2,166,240. The resulting pigment was salt-ground as described in Example 1C. The salt-ground pigment has an XRD-spectrum characterized by 2θ peaks at 13.0°, 25.8°, 31.8°, 39.9° and 46.1° and the absorption spectrum in a 50% by weight concentration in a 9:1 by weight mixture of MAKROLON CD 2000 (registered trade mark) and DYNAPOL L206 (registered trade mark) shown in FIG. 6.

A photoconductive recording material was produced as described for Example 41 except that the pigment used was brominated metal-free tetrabenzotriazaporphyrin.

The characteristics of the thus obtained photoconductive recording material were determined with a light dose of 26.4 mJ/m2 of 650 nm light as described above with the following results:

CL= −285 V

No photosensitivity was observed up to light doses of 264 mJ/m2 of 650 mm light.

EXAMPLE 44

Metal-free tetranaphthalotriazaporphyrin was prepared by first converting 2,3-naphthalodinitrile to 1,3-diimino-benz(f)isoindoline by reaction with ammonia in methanol as described by B. L. Wheeler et al. in J. Amer. Chem. Soc. Vol 106, p. 7405 (1984) and then reacting 30.0 g of 1,3-diiminobenz(f)isoindoline with 30 ml of nitromethane in 200 ml of methanol to form the nitro-methylene compound:

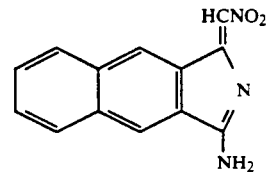

by heating under reflux for 3 days giving a yield after washing with methanol of 22.9 g. Its composition was confirmed by an m/e of 239 (100%) in its mass spectrum. A suspension of 19.5 g of 1,3-diiminobenz(f)isoindoline and 23.9 g of said nitro-methylene compound in nitrobenzene was added over over a period of 30 minutes to refluxing nitrobenzene making 400 ml of nitrobenzene in total. The resulting suspension was then heated for 16 hours under reflux. The water formed together with some nitrobenzene was driven off continually. The green pigment produced was filtered off hot, then washed with ethanol and dimethylformamide to remove the residual nitrobenzene and finally extracted for 2 days with 1.5 l of 1-methyl-naphthalene to remove impurities, thereby resulting in 8.7 g of a highly crystalline green pigment. This pigment is metal-free tetranaphthalotriazaporphyrin as found by its elemental analysis: C:81.36%, N:13.44% and H:3.69%, the theoretical values for $C_{49}H_{27}N_7$ being: C:82.45%, N: 13.74% and H:3.81. Said pigment exhibits a powder X-ray diffraction spectrum with sharp lines at 2θ values of 5.8°, 6.2°, 11.7°, 13.4°, 16.5°, 17.6°, 18.5°, 23.4°, 24.0°, 24.6°, 26.1°, 26.8°, 29.4° and 30.2° and does not correspond to any known X-ray diffraction spectrum of metal-free tetra-azatetranaphthaloporphyrin also known as metal-free naphthalocyanine as described by M. L. Kaplan et al. in Mol. Cryst. Liquid Cryst. Vol. 112, p. 345–358 (1984) and neither does its absorption spectrum in 1-chloronaphthalene with a main peak maximum at 683 nm correspond with that of metal-free naphthalocyanine with main peak maximum at 780 nm as described by S. A. Hikhalenko et al. in Zhurnal Obshchei Khimii Vol 39, p. 2554–2558 (1969).

Figure 7:
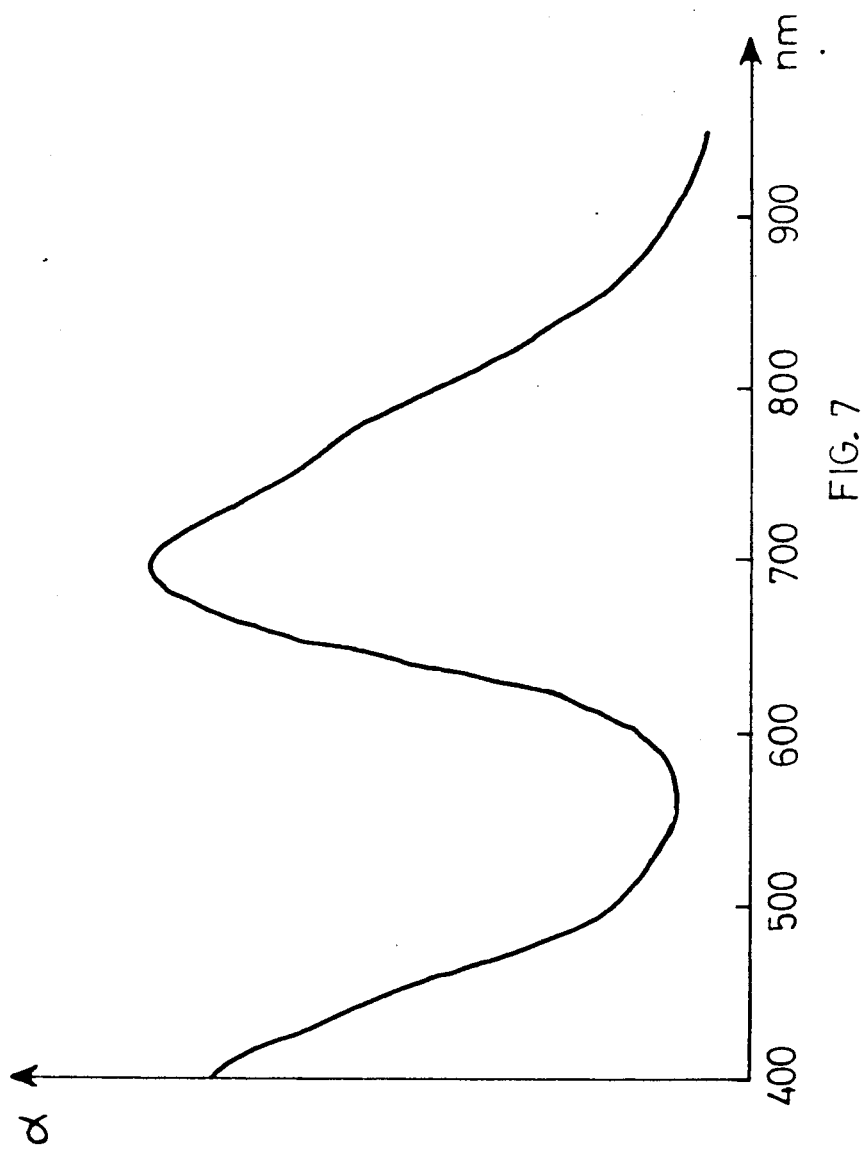
FIG. 7 represents the absorption spectrum of a tetranaphthalotriazaporphyric as described in Example 44.

Its absorption spectrum at a concentration of 40% by weight in MAKROLON CD 2000 (registered trade mark) is shown in FIG. 7.

In the production of a photoconductive recording material a 100 μm thick polyester film base (vacuum-coated with a conductive layer of aluminium) was doctor-blade coated successively with a dispersion of charge generating pigment to a thickness of 0.6 μm and with a filtered solution of charge transport substance and binder to a thickness of 14 μm.

The charge generating pigment dispersion was prepared by mixing 1 g of the metal-free tetranaphthalo-triazaporphyrin as prepared above with 1.14 g of JAGOTEX F218 (registered trade name for a 60 wt. % solution of a hydroxy-group containing styrene-acrylic copolymer in 2:1 by volume solvent mixture of xylene/ethylglycolacetate) and 17.44 g of dichloromethane for 10 minutes in a pearl mill, then adding 0.315 g of DESMODUR N75 (registered trade name for a 75 wt. % solution of a triisocyanate in a 1:1 by volume solvent mixture of 1-methoxy-propylacetate/xylene) and mixing for a further 2 minutes.

The resulting layer was hardened at 100° C. for 2 hours prior to coating the charge transport layer with a filtered solution of 4 g of 1,2-bis(1,2-dihydro-2,2,4-trimethyl-quinolin-1-yl)ethane, 4 g of MAKROLON 5700 (registered trade mark) and 42 g dichloromethane. This layer was then dried for 16 h at 50 ° C.

The characteristics of the thus obtained photoconductive recording material were determined with a light dose of 195.7 mJ/m² of 700 nm light as described above with the following results:

CL = −150 V
RP = −135 V
% discharge = 10

I claim:

1. An electrophotographic recording material comprising a conductive support and a photosensitive layer containing at least one photoconductive compound that has p-type charge generating capacity and is a tetrabenzoporphyrin type compound represented by the following general formula (I):

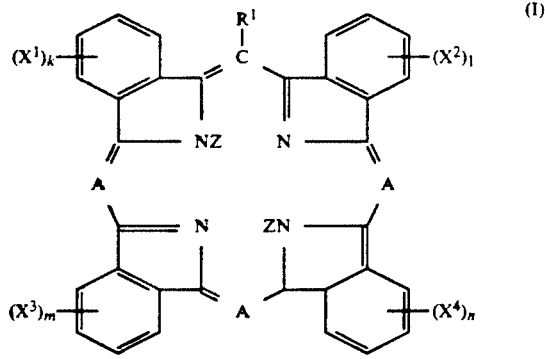

(I)

wherein:
each of $X^1$, $X^2$, $X^3$, and $X^4$ (same or different) represents a substituent selected from the group consisting of halogen, nitro, cyano, $(C_1-C_2)$ alkyl and alkoxy or 2 $X^1$'s, 2 $X^2$'s, 2 $X^3$'s or 2 $X^4$'s together represent the atoms necessary to form a carbocyclic or heterocyclic ring system including such ring systems in substituted form;

k, l, m, and n each and independently represent zero or an integer 1 to 4, $R^1$ represents hydrogen, a $(C_1-C_2)$ alkyl, aralkyl or aryl group; each of the A's (same or different) represents nitrogen, or a $CR^2$ group, wherein each of the $R^2$'s (same or different) represents hydrogen, a $(C_1-C_2)$ alkyl, aralkyl or aryl group; and Z is hydrogen or two groups Z together stand for a metal atom which in the case of higher valency state than 2, will be linked to (an) additional valency compensating atom(s) or group.

2. An electrophotographic recording material according to claim 1, wherein said photosensitive layer is a photosensitive charge generating layer that has in contiguous relationship thereto a charge transporting layer.

3. An electrophotographic recording material according to claim 2, wherein said photoconductive compound is applied in combination with a resin binder to form a charge generating layer adhering directly to a conductive support.

4. An electrophotographic recording material according to claim 3, wherein said photoconductive compound is selected from the group consisting of a cellulose ester, acrylate and methacrylate resins, polyvinyl chloride, copolymers of vinyl chloride, polyester resins, aromatic polycarbonate resins, silicon resins, polystyrene and copolymers of styrene and maleic anhydride, copolymers of butadiene and styrene, poly-N-vinylcarbazole and copolymers of N-vinylcarbazole having a N-vinylcarbazole content of at least 40% by weight.

5. An electrophotographic recording material according to claim 2 to 10, wherein the content of said photoconductive compounds in the charge generating layer is in the range 30 to 70% by weight with respect to the total weight of said layer.

6. An electrophotographic recording material according to claim 2, wherein the thickness of said charge generating layer is less than 5 μm.

7. An electrophotographic recording material according to claim 2, wherein the thickness of said charge transporting layer is in the range of 5 to 50 μm.

8. An electrophotographic recording material according to claim 2, wherein in the recording material an adhesive layer or barrier layer is present between the photosensitive layer or the charge transport layer and the support and the thickness of said barrier layer is not more than 1 micron.

9. An electrophotographic recording material according to claim 1, wherein said tetrabenzotriazaporphyrin is selected from the group consisting of

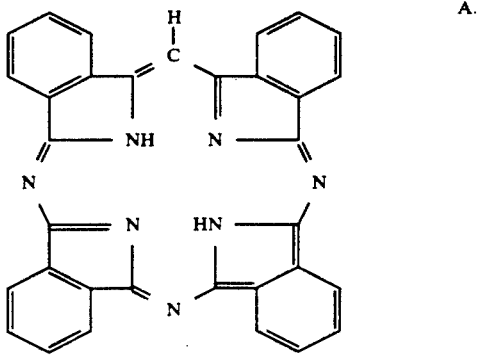

A.

-continued
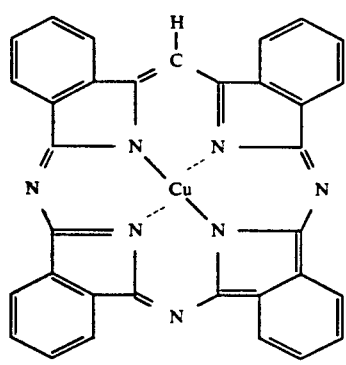 B.
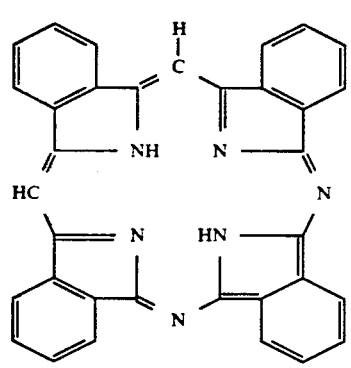 C.
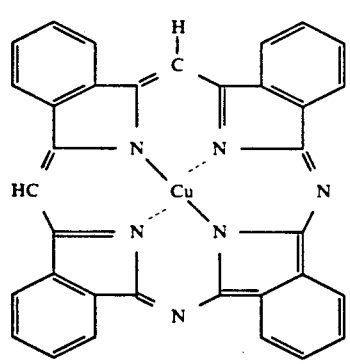 D.
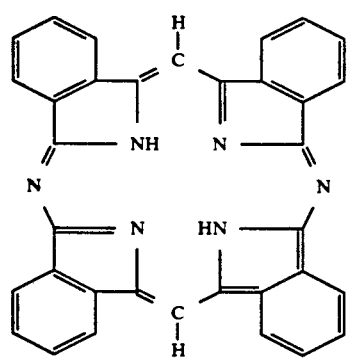 E.
-continued
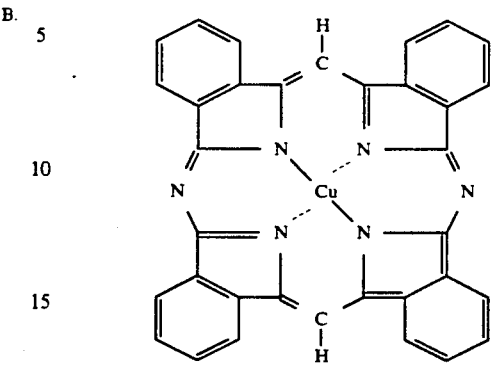 F.
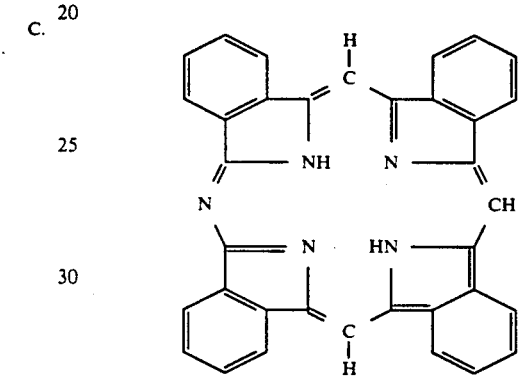 G.
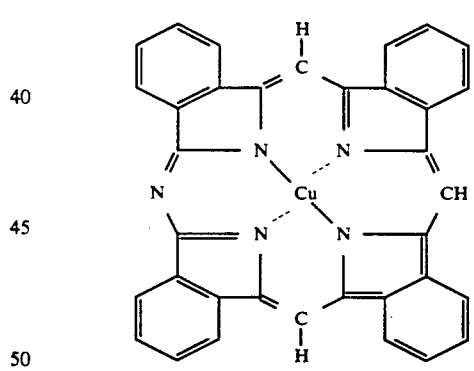 H.
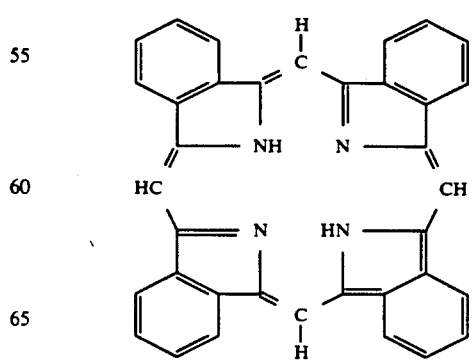 I.

-continued

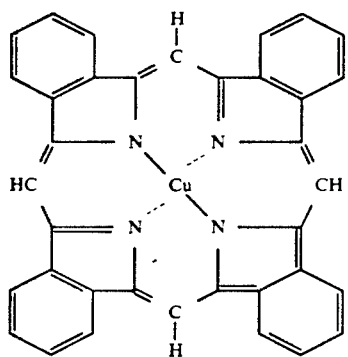

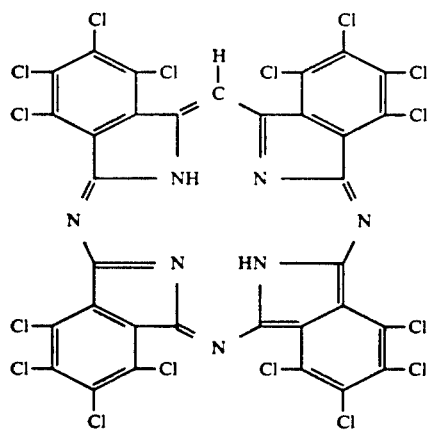

K.

-continued

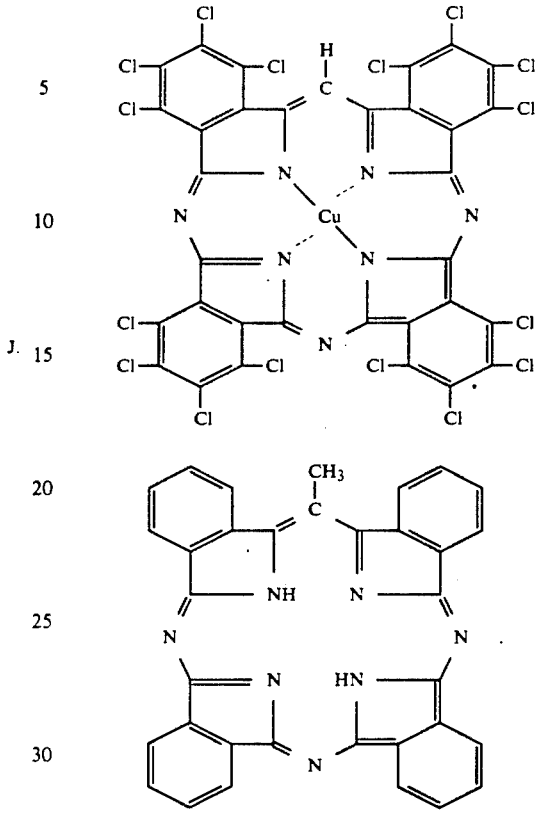

J.

L.

M.

10. An electrophotographic recording material according to claim 1, wherein said photoconductive compound is metal-free tetrabenzotriazaporphyrin.

11. An electrophotographic recording material according to claim 1, wherein said photoconductive compound is metal-free tetrabenzotriazaporphyrin in the ω-crystalline modification characterized by its absorption spectrum shown in FIG. 1c herein and its X-ray diffraction pattern exhibiting strong lines at Bragg angles ($2\theta$) of 8.5; 10.2; 11.9; 14.4; 18.0; 20.4; 22.6; 24.0; 24.7 and 29.8 degrees.

12. An electrophotographic recording material according to claim 1, wherein said photoconductive compound is metal-free tetrabenzotriazaporphyrin in the ω-crystalline modification which has been treated with hot methyl benzoate or hot xylene.

13. An electrophotographic recording material according to claim 1, wherein the content of said photoconductive compounds in the photosensitive layer is in the range of 0.05 to 90 by weight with respect to the total weight of said layer.

14. An electrophotographic recording material according to claim 1, wherein the thickness of said photosensitive layer is less than 30 um.

15. An electrophotographic recording material according to claim 1, wherein the conductive support is made of aluminium, steel, brass or paper or resin material incorporating or being coated with a conductivity enhancing substance, the support being in the form of a foil, web or being part of a drum.

* * * * *